United States Patent [19]

Fujiwara et al.

[11] Patent Number: 5,386,405
[45] Date of Patent: Jan. 31, 1995

[54] DISK APPARATUS HAVING A READ ERROR RETRY FUNCTION

[75] Inventors: Toru Fujiwara; Shigeyuki Yanagi; Toru Ikeda, all of Kawasaki, Japan

[73] Assignee: Fujitsu Limited, Japan

[21] Appl. No.: 21,281

[22] Filed: Feb. 22, 1993

[30] Foreign Application Priority Data

Feb. 27, 1992 [JP] Japan .................. 4-041221
Mar. 19, 1992 [JP] Japan .................. 4-063018

[51] Int. Cl.⁶ .............. G11B 5/02; G11B 5/09; G11B 5/76
[52] U.S. Cl. .................. 369/59; 360/51; 360/32
[58] Field of Search ............ 360/32, 46, 51, 53, 360/48, 67, 26; 369/53, 54, 116, 124, 59

[56] References Cited

U.S. PATENT DOCUMENTS

| | | | |
|---|---|---|---|
| 4,037,257 | 7/1977 | Chari | 360/51 |
| 4,245,264 | 1/1981 | Allen | 360/51 |
| 4,748,611 | 5/1988 | Tsuyoshi et al. | 369/59 |
| 4,872,155 | 10/1989 | Yokogawa et al. | 369/59 |
| 5,062,091 | 10/1991 | Maeda et al. | 369/59 |
| 5,088,080 | 2/1992 | Ishibashi et al. | 369/59 X |
| 5,111,443 | 5/1992 | Yokogawa | 369/59 X |
| 5,233,482 | 8/1993 | Galbraith et al. | 360/46 |
| 5,233,589 | 8/1993 | Saito et al. | 369/59 X |

*Primary Examiner*—Donald Hajec
*Assistant Examiner*—Thien Minh Le
*Attorney, Agent, or Firm*—Greer, Burns & Crain, Ltd.

[57] ABSTRACT

A disk apparatus having a readout circuit for providing readout data signals and capable of immediately detecting runaway of a readout clock signal generated from a VFO (Variable Frequency Oscillator) in the readout circuit if such occurs. The disk apparatus is free from a read error due to a permanent defect on a disk, e.g., an optical disk, or other causes. The disk apparatus includes a head for picking up signals from a disk, and a readout circuit for providing a readout signal and a readout clock signal, including a digitizing circuit for receiving and digitizing a data signal picked up by the head into a binary data signal, a reference clock generator for generating a reference clock signal and a variable frequency oscillator for receiving a read-gate signal, the digitized binary data signal and the reference clock signal and generating a readout data signal and a readout clock signal, each synchronized with the reference clock signal. The disk apparatus further includes a detecting circuit for supplying the read-gate signal to and receiving the reference clock signal and the readout clock signal from the readout circuit and for detecting that a synchronizing operation in the variable frequency oscillator is in an abnormal state and resetting the read-gate signal when a frequency difference between the reference clock signal and the readout clock signal exceeds a predetermined value.

15 Claims, 25 Drawing Sheets

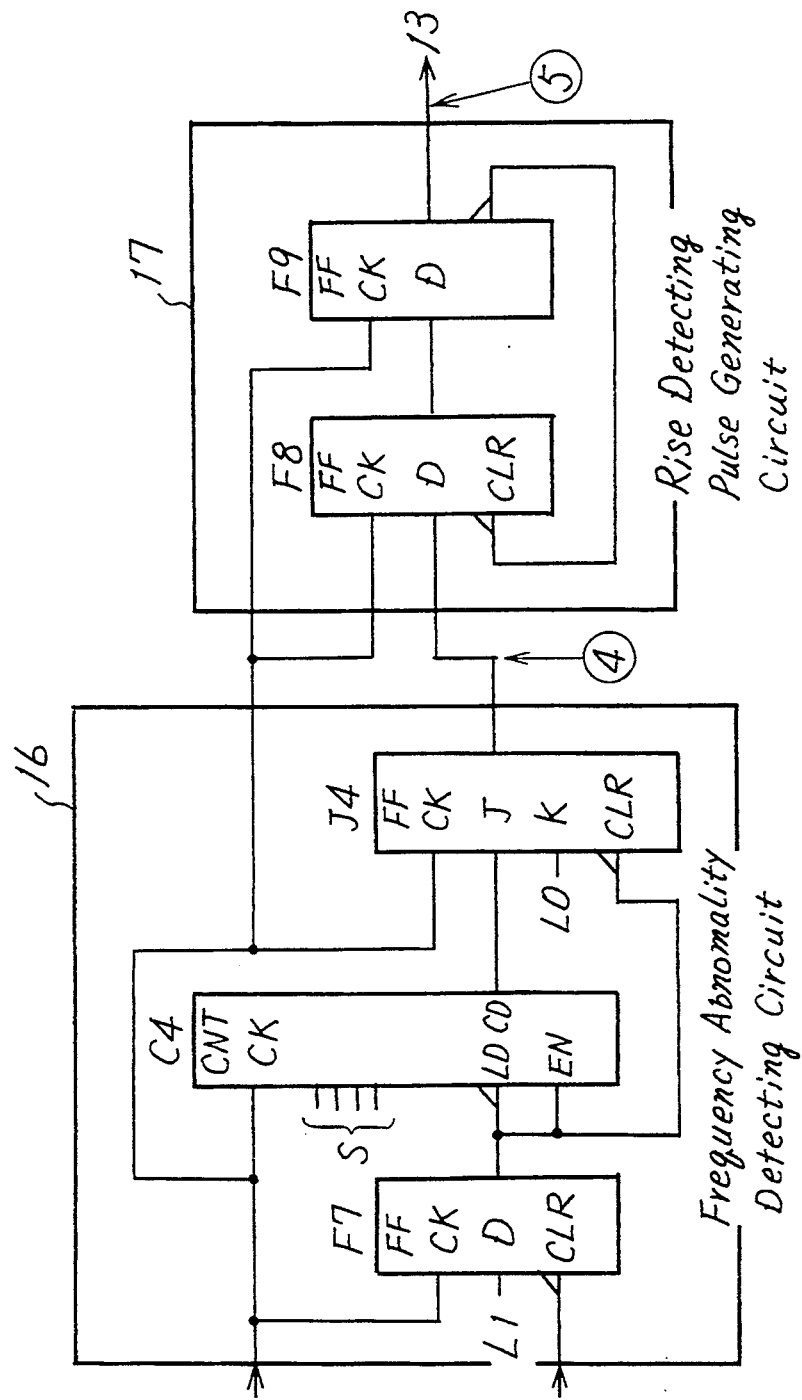

① RAW DATA Generating Circuit

②

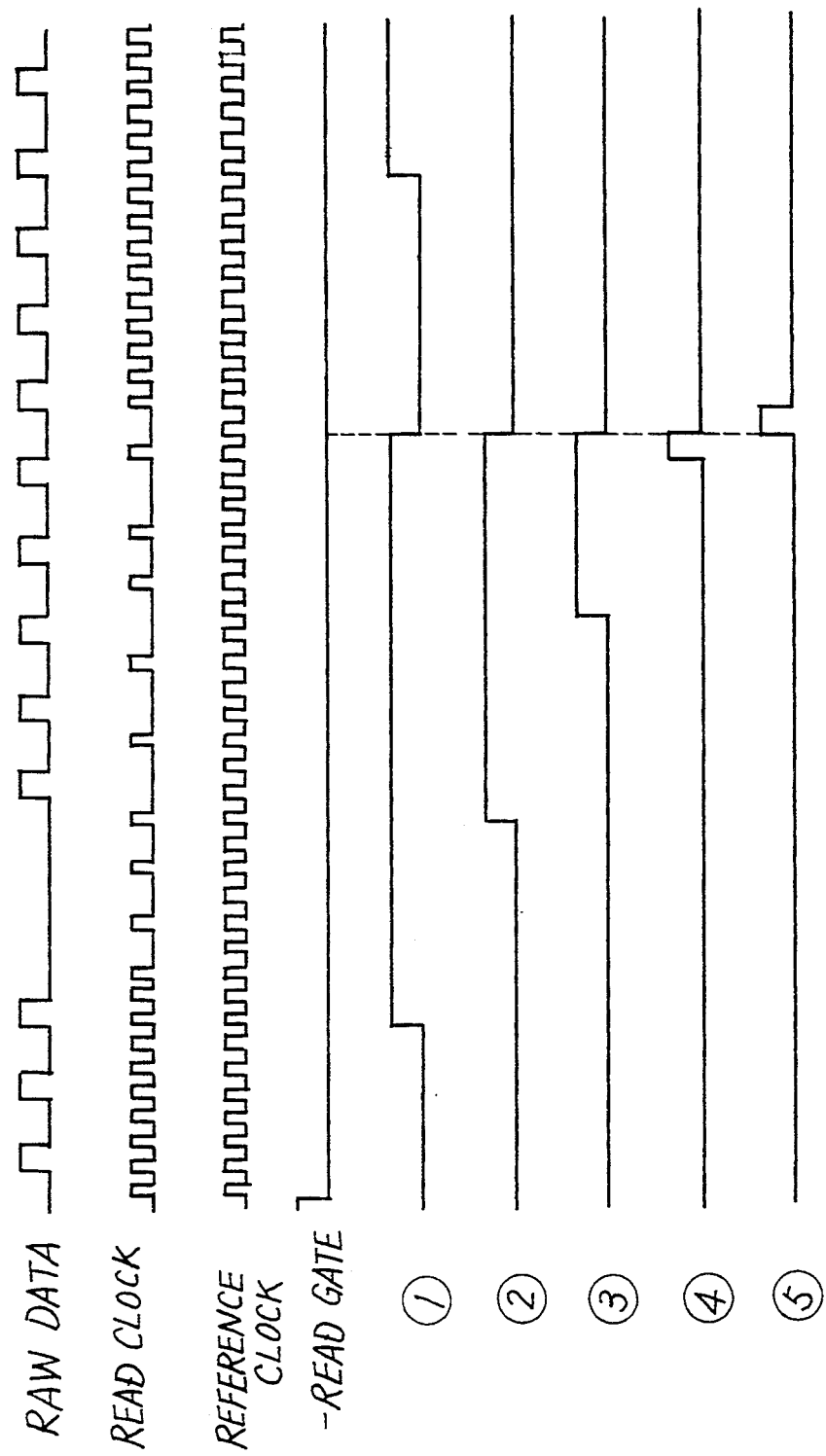

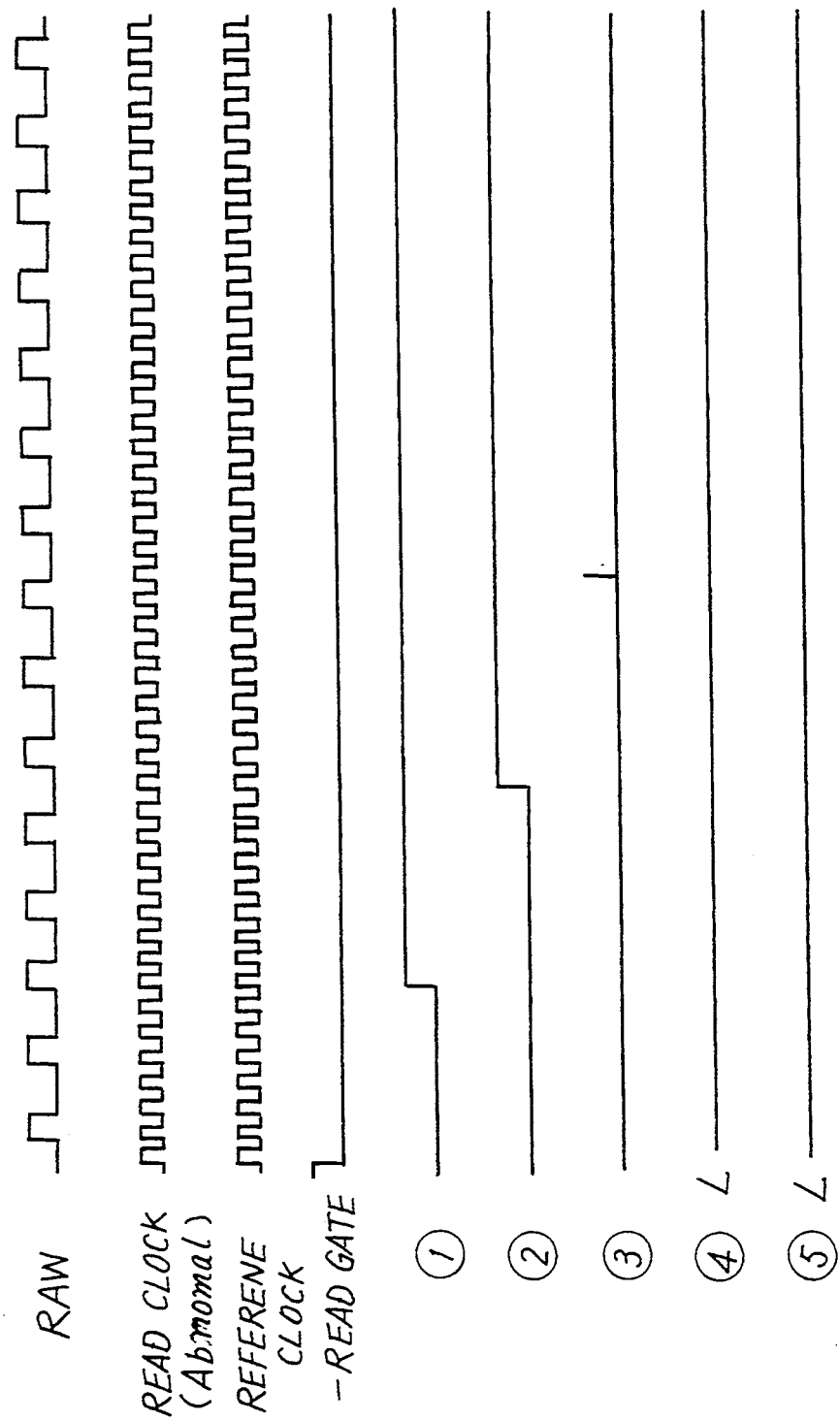

DISK APPARATUS HAVING A READ ERROR RETRY FUNCTION

BACKGROUND OF THE INVENTION

1. Field of the Invention

The present invention relates to disk apparatuses, e.g., optical disk apparatus, magnetic disk apparatus, etc. More particularly, the present invention relates to a disk apparatus having a reproducing system improved in the function of retry for reading data when a read error occurs.

2. Description of the Related Art

A write/read control block in a typical optical disk apparatus is arranged as shown exemplarily in FIG. 1. In this example, a head 2 is connected with a servo circuit 3, write circuit 4, and a read circuit 5, which are controlled by an upper-level controller 6.

The head 2 optically picks up information recorded on a disk 1. The servo circuit 3 controls the head 2 in either a focus direction or a track direction on the basis of the signal picked up by the head 2.

The servo circuit 3 moves the head 2 in the track direction in response to a seek instruction from the upper-level controller 6.

The write circuit 4 transfers write data to the head 2 and also controls the emission power of a light source in the head 2 in response to a write instruction from the upper-level controller 6.

The read circuit 5 receives a read-gate signal (READ GATE) from the upper-level controller 6 and binarizes the analog signal picked up by the head 2 and transfers a read clock (READ CLOCK) and read data (READ DATA), synchronized with the read clock, to the upper-level controller 6.

The upper-level controller 6 controls the servo circuit 3, the write circuit 4, and the read circuit 5.

One example of the read circuit 5 is shown in FIG. 2. In this example, the read circuit 5 is provided with a differentiating circuit 7, an AGC circuit 8, a digitizing circuit 9, a variable frequency oscillator (hereinafter referred to as "VFO") 10, and a reference clock (REFERENCE CLOCK) generator 11.

For reproduction of data, processing is executed as follows. First, an analog signal (RF signal) picked up by the head 2 is differentiated in the differentiating circuit 7 and formed into a signal with a fixed amplitude in the AGC circuit 8.

The output of the AGC circuit 8 is converted into pulse-shaped binary data (hereinafter referred to as "RAW data") in the digitizing circuit 9, and it is then input to the VFO 10.

The VFO 10 is fed with the binary data (RAW data) and a reference clock (REFERENCE CLOCK) from the reference clock generator 11 and transfers to the upper-level controller 6 a read clock (READ CLOCK) and read data (READ DATA) synchronized with the read clock.

The upper-level controller 6 detects a data start identification region from the read data and read clock and fetches data from the detected region.

At this time, an error correction (e.g., maximum 80 byte/sec) is made by an error correction function, for example, being Reed-Solomon codes.

The VFO 10 is controlled by a read-gate signal (READ GATE) from the upper-level controller 6. When the read-gate signal is asserted to be valid, the VFO 10 executes a phase-lock operation in a PLL (Phase Locked Loop) provided therein. The VFO 10 makes the frequency and phase of the binary data synchronized with the reference clock (REFERENCE CLOCK) on the basis of VFO phase-lock patterns in the binary data to generate a read clock and read data synchronized therewith. When the read-gate signal (-READ GATE) is negated, the synchronization is suspended.

The timing chart of the read-gate signal (READ GATE) is shown in FIG. 3. In FIG. 3, ①shows a data format on the disk 1, ② the read-gate signal (-READ GATE: read-gate signal of negative logic) during writing, and ③ the read-gate signal (-READ GATE) during reading.

The read-gate signals (-READ GATE) at ② and ③ are asserted when it is necessary to read RAW data from the preformat area and user area in the data format shown at ① in FIG. 3.

The data format, shown at ① in FIG. 3, is a format for one sector of a disk track, which comprises a preformat area (a preset area) and a user area (an area where data is written by the user).

The preformat area is provided with three areas, each comprising "VFO+AM+ID+CRC", following a sector mark. In FIG. 3, "VFO" represents a VFO synchronizing zone, "AM" an address mark, "ID" an ID region (identification information region), and "CRC" an error check code.

To read an ID region in the preformat area, it is necessary to read the synchronizing zone of "VFO", which precedes "ID", and execute a synchronizing operation in the VFO 10.

To read data from the user area, it is necessary to read the synchronizing zone of "VFO", which precedes the data, and execute a synchronizing operation.

It should be noted that the VFO synchronizing zones are each stored with a synchronizing pattern (VFO synchronizing pattern) necessary for a synchronizing operation in the VFO 10.

Reading of data from the ID region or the user area is enabled when the read-gate signal (-READ GATE) shown at ② or ③ in FIG. 3 is available. That is, the ID region is read by using the read-gate signal (-READ GATE) shown at ② or ③ in FIG. 3 whether the process concerned is a data writing or reading operation.

When the read-gate signal is asserted, a VFO synchronizing pattern, which is RAW data in the VFO synchronizing zone at ①, is detected to determine an oscillating frequency of the VFO 10.

FIG. 4 shows the process of an operation taking place from the assertion of the read-gate signal to the completion of the synchronizing operation. FIG. 5 shows an example in which a phase lock cannot be effected.

In the first operation example of the VFO 10, shown in FIG. 4, ① shows the output signal waveform of the AGC circuit 8, and ② is an enlarged view of a part of the waveform shown at ①. Further, ③ in FIG. 4 shows binary data (RAW data), ④ the read-gate signal, and ⑤ the phase lock condition.

In the illustrated example, the waveform shown at ① and ② is normal. For example, at time T1, the read-gate signal (Read Gate) is asserted, and the VFO 10 initiates a synchronizing operation according to a VFO synchronizing pattern (period t1).

Thereafter, the synchronizing operation is completed (normally) at time T2.

In the second operation example, shown in FIG. 5, ① through ⑤ show the same as those in FIG. 4. In this example, however, the output waveform of AGC, shown at ① and ② is disordered, so that the VFO 10 has failed to effect phase locking.

More specifically, at time T1, the read-gate signal is asserted to initiate a synchronizing operation according to a VFO synchronizing pattern (period t1). Here, it is assumed that the waveform is disordered as illustrated due to a defect, e.g., flaw, stain, etc., on the optical disk, or a noise in the circuit.

At this time, the period of the binary data (RAW data), shown at ③, is disordered as at t1 and t3, causing the frequency of PLL to go out of control.

If the frequency of PLL goes out of control as described above, the data start identification region cannot be detected, so that the system falls into a state where synchronizing operation cannot be effected, resulting in a data read error.

Further, once the PLL frequency goes out of control, clocking (timing to data bits) can not be effected unless the read-gate signal is once negated and then reasserted to execute synchronizing operation once more.

In actual practice, the preformat area on the disk 1 contains three VFO synchronizing zones, as shown in FIG. 3. Therefore, when the read clock goes out of control at the first VFO synchronizing zone, if the read-gate signal from the upper-level controller 6 is continuously used as it is for the VFO 10, read clocks which are generated from the second and third VFO zones also go out of control.

Under the above-described circumstances, there have heretofore been the following problems:

(1) When an ID region is to be read from a disk, if the disk has a flaw or dust on its surface, the VFO circuit may fail to effect the synchronizing operation. In such a case, the read clock generated in the VFO circuit goes out of control, resulting in a failure to read the ID region.

If the read clock goes out of control during the data reading operation, the data cannot be reproduced normally.

(2) If the read clock from VFO goes out of control during the data writing operation and hence it becomes impossible to read an ID region on a disk, it is necessary to write data in another region on the disk by executing alternate processing.

In such a case, a data region for one sector must be wasted.

SUMMARY OF THE INVENTION

In view of the above-described problems of the prior art, it is an object of the present invention to provide a disk apparatus of high reliability which is free from a read error due to a permanent defect on a disk, e.g., an optical disk, or other causes.

It is another object of the present invention to provide a disk apparatus which is improved in the read function so that when the VFO read clock goes out of control, it can be detected immediately, and the normal read clock can be generated by processing executed thereafter.

It is still another object of the present invention to provide a disk apparatus which includes a head for picking up signals from a disk, a readout circuit for providing a readout data signal and a readout clock signal, including a digitizing circuit for receiving and digitizing a data signal picked up by the head into a binary data signal, a reference clock generator for generating a reference clock signal and a variable frequency oscillator for receiving a read-gate signal, the digitized binary data signal and the reference clock signal and generating a readout data signal and a readout clock signal, each synchronized with the reference clock signal, and a detecting circuit for supplying the read-gate signal to and receiving the reference clock signal and the readout clock signal from the readout circuit and for detecting that a synchronizing operation in the variable frequency oscillator is in an abnormal state and resetting the read-gate signal when a frequency difference between the reference clock signal and the readout clock signal exceeds a predetermined value.

It is a further object of the present invention to provide a disk apparatus which includes a head for picking up signals from a disk, a readout circuit for providing a readout data signal and a readout clock signal, including a digitizing circuit for receiving and digitizing a data signal picked out by the head into a binary data signal, a reference clock generator for generating a reference clock signal and a variable frequency oscillator for receiving a read-gate signal, the digitized binary data signal and the reference clock signal and generating a readout data signal and a readout clock signal, each synchronized with the reference clock signal, an upper-level controller for providing the read-gate signal, and a timing control circuit for receiving the read-gate signal from the upper-level controller and controlling the timing of supplying the read-gate signal to the readout circuit.

BRIEF DESCRIPTION OF THE DRAWINGS

FIG. 12 is a detailed block diagram of a frequency abnormality detecting circuit and rise detecting pulse generating circuit, shown in FIG. 9.

FIG. 14 is a timing chart showing an operation of the runaway detecting circuit when VFO goes out of control.

FIG. 15 is a timing chart showing an operation of the runaway detecting circuit when VFO normally operates.

DESCRIPTION OF THE PREFERRED EMBODIMENTS

Figure 6:
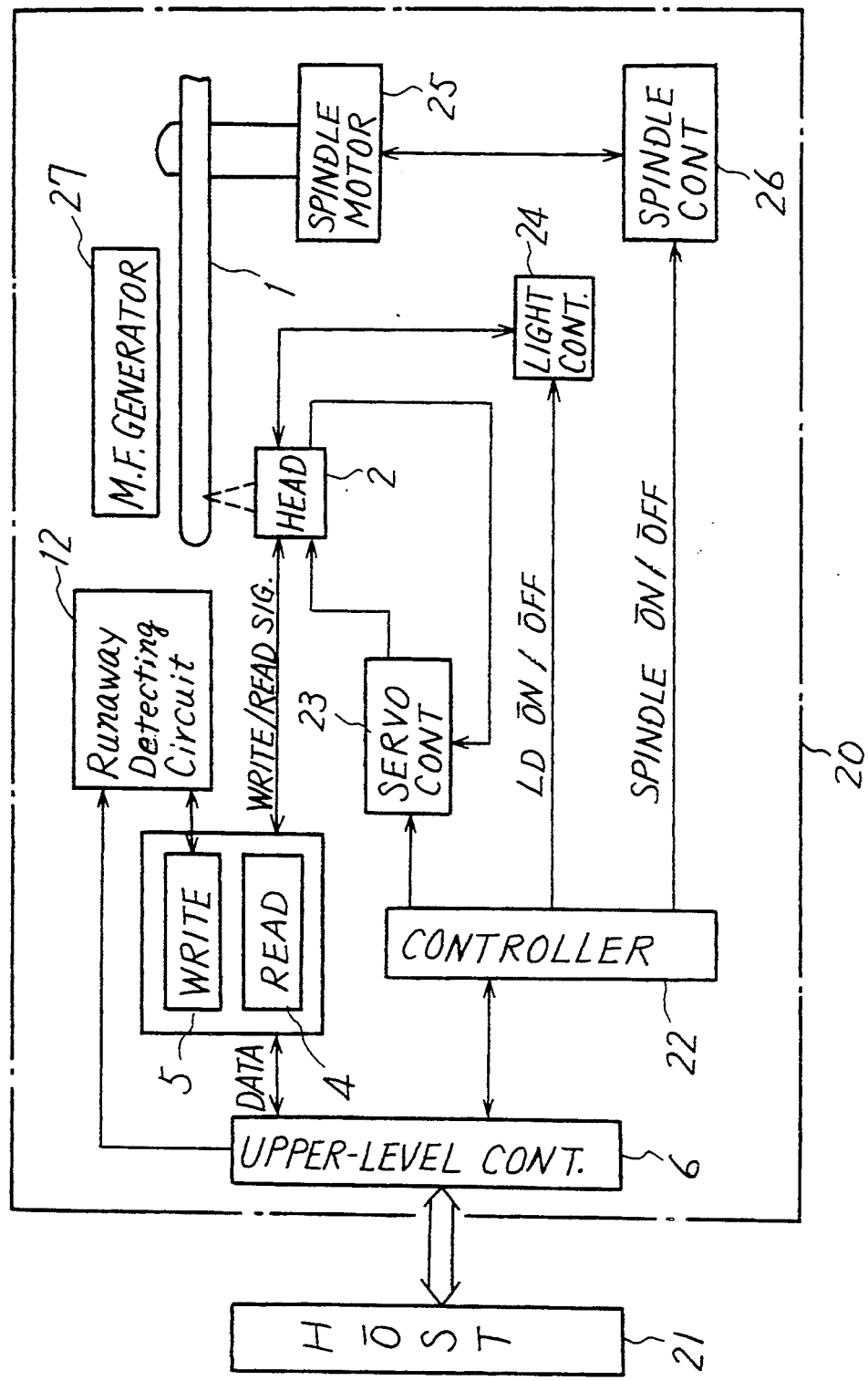
FIG. 6 is a block diagram of a disk apparatus according to a first embodiment of the present invention.

FIG. 6 is a block diagram showing the arrangement of an optical disk apparatus according to a first embodiment of the present invention.

In this embodiment, an optical disk apparatus 20 is provided with an upper-level controller 6, a write circuit 4, a read circuit 5, a controller 22, a servo controller 23, a head 2, a light quantity controller 24, a spindle motor 25, a spindle motor controller 26, a disk 1, a magnetic field generator 27, and a runaway detecting circuit 12.

The optical disk apparatus 20 is connected to a host (host computer) 21 during use.

Figure 1:
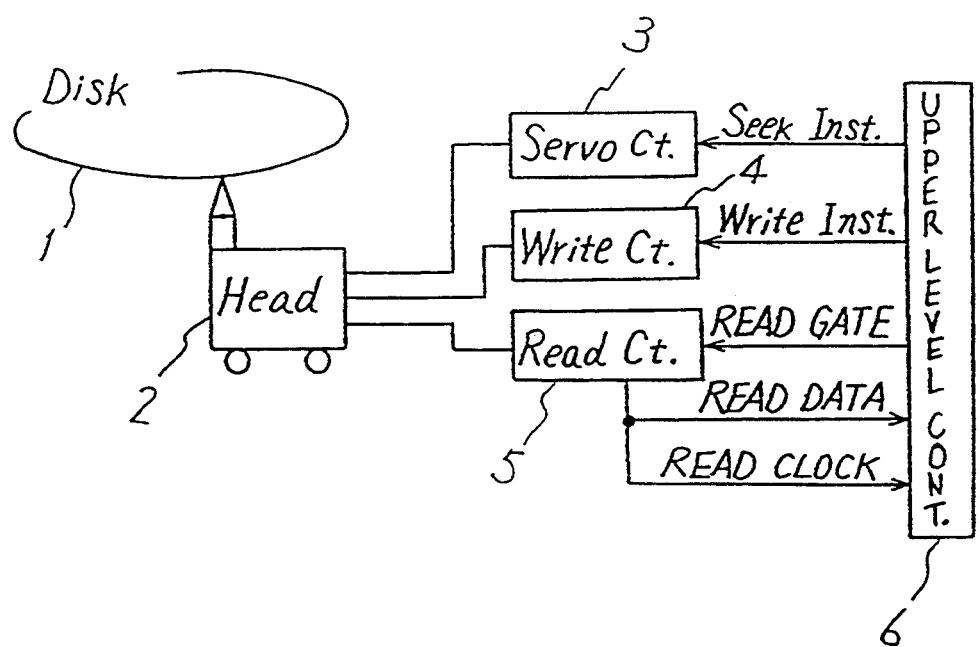
FIG. 1 is a control block diagram of a typical optical disk apparatus.
Figure 2:
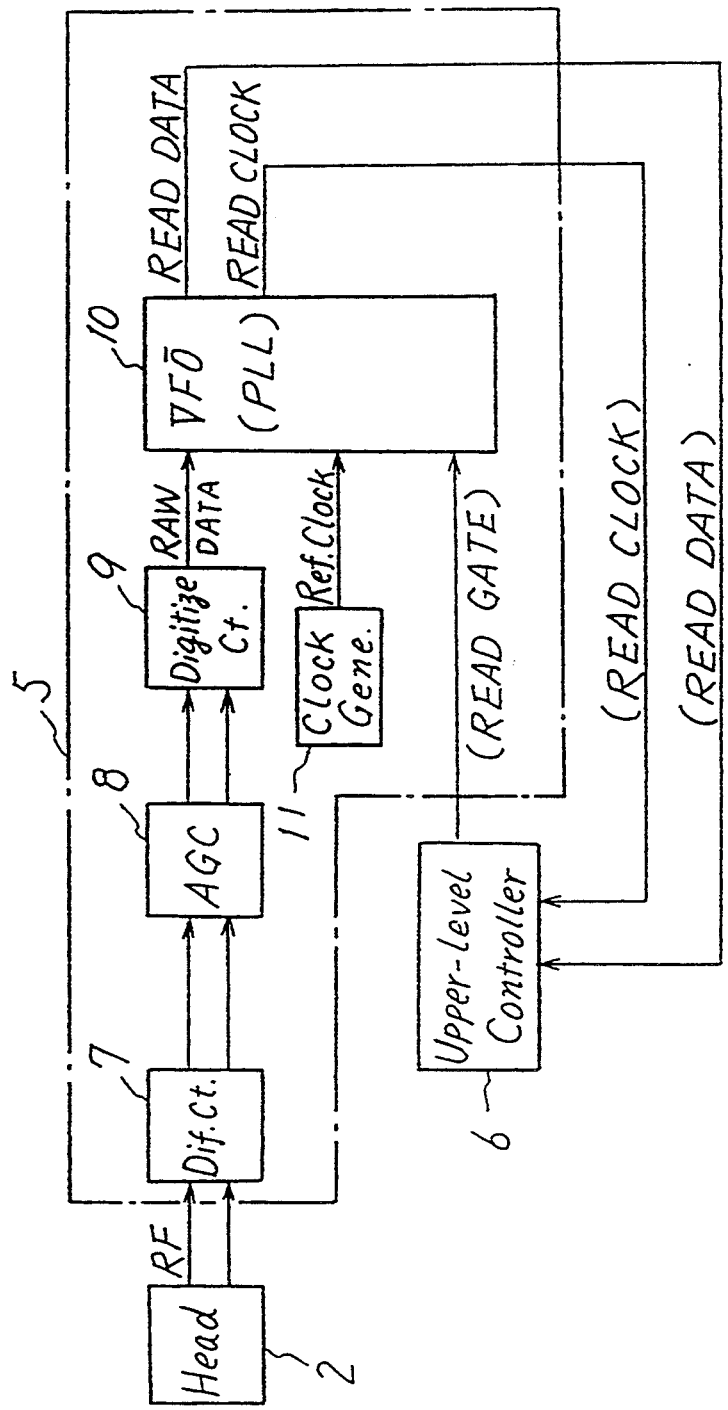
FIG. 2 is a block diagram showing the relationship between a read circuit and upper-level controller, shown in FIG. 1.
Figure 7:
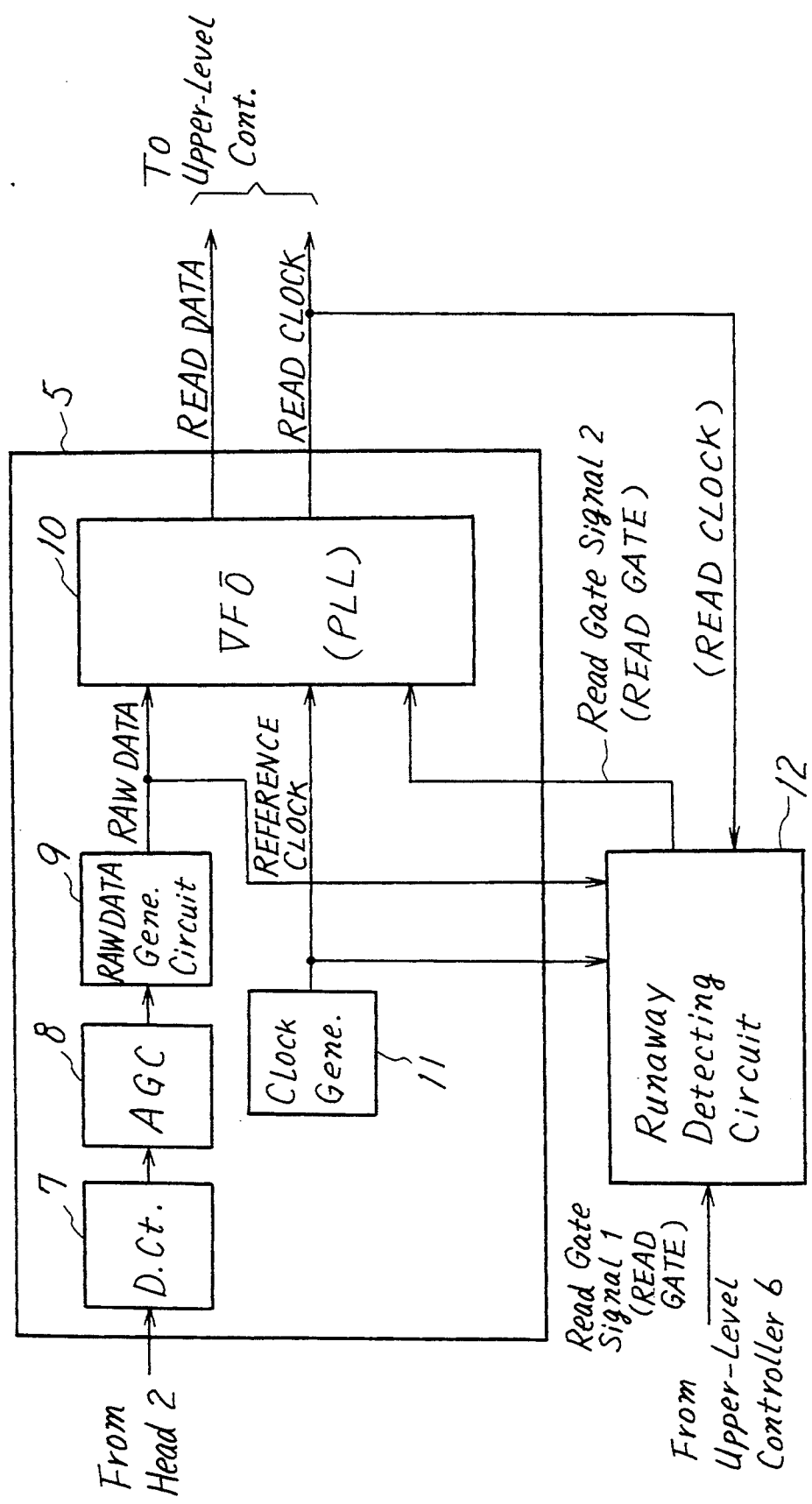
FIG. 7 is a block diagram showing the relationship between a read circuit and runaway detecting circuit, shown in FIG. 6.

The arrangement of the read circuit 5 and the runaway detecting circuit 12 is shown in FIG. 7. The read circuit 5 is provided with a differentiating circuit 7, an AGC circuit 8, a digitizing circuit 9, a VFO 10, and a reference clock generator 11. The arrangements of these circuit elements are the same as those explained with reference to FIG. 2.

The read circuit 5 is connected with the runaway detecting circuit 12 to detect runaway of the read clock generated in the VFO 10.

The runaway detecting circuit 12 is fed with a read clock (READ CLOCK) output from the VFO 10 in the read circuit 5, binary data (RAW data) and reference clock (REFERENCE CLOCK), which are input to the VFO 10, together with a read-gate signal (READ GATE 1) that is given from the upper-level controller 6.

The runaway detecting circuit 12 outputs to the VFO 10 a read-gate signal (READ GATE 2) produced on the basis of the read-gate signal 1, which is given from the upper-level controller 6.

The arrangement of the runaway detecting circuit 12 will be explained below in detail with reference to FIGS. 8 to 12.

Figure 8:
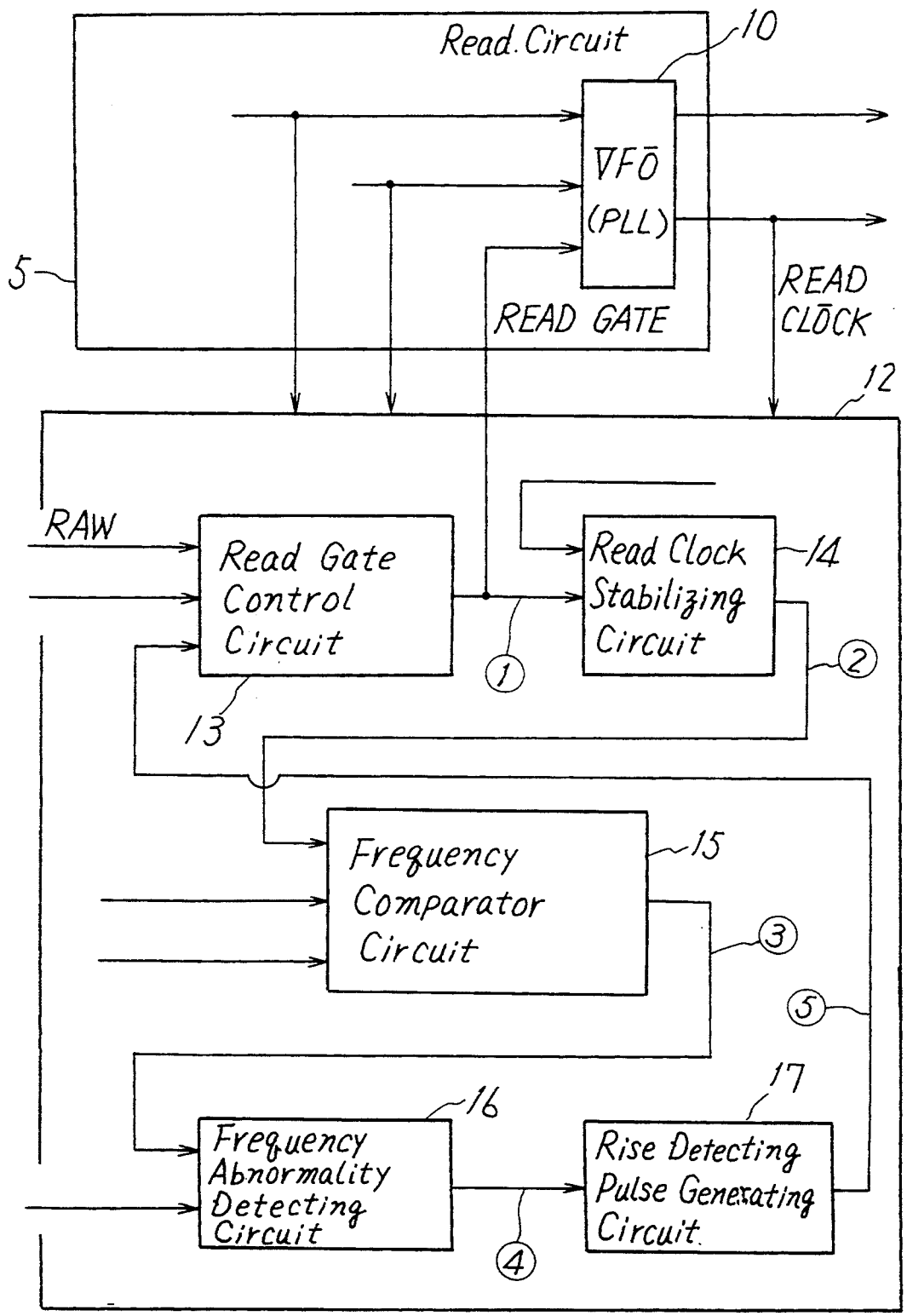
FIG. 8 is a block diagram of the runaway detecting circuit.

For facilitating understanding, the general arrangement of the runaway detecting circuit 12 is shown in the block diagram of FIG. 8, and the arrangements of various portions of the runaway detecting circuit 12 are shown in detail in FIGS. 9 to 12.

The runaway detecting circuit 12 comprises a read-gate control circuit 13, a read clock stabilizing circuit 14, a frequency comparator circuit 15, a frequency abnormality detecting circuit 16, and a rise detecting pulse generating circuit 17.

It should be noted that in the following description, made with reference to FIGS. 9 to 12, D (delay) flip-flop is represented by D-FF, while J-K flip-flop is represented by JK-FF. Further, a read-gate signal of negative logic is represented by "-READ GATE".

In addition, the outputs of various portions, shown in FIGS. 9 to 12, are represented by 1 to 5 in common with FIG. 8.

Figure 9:
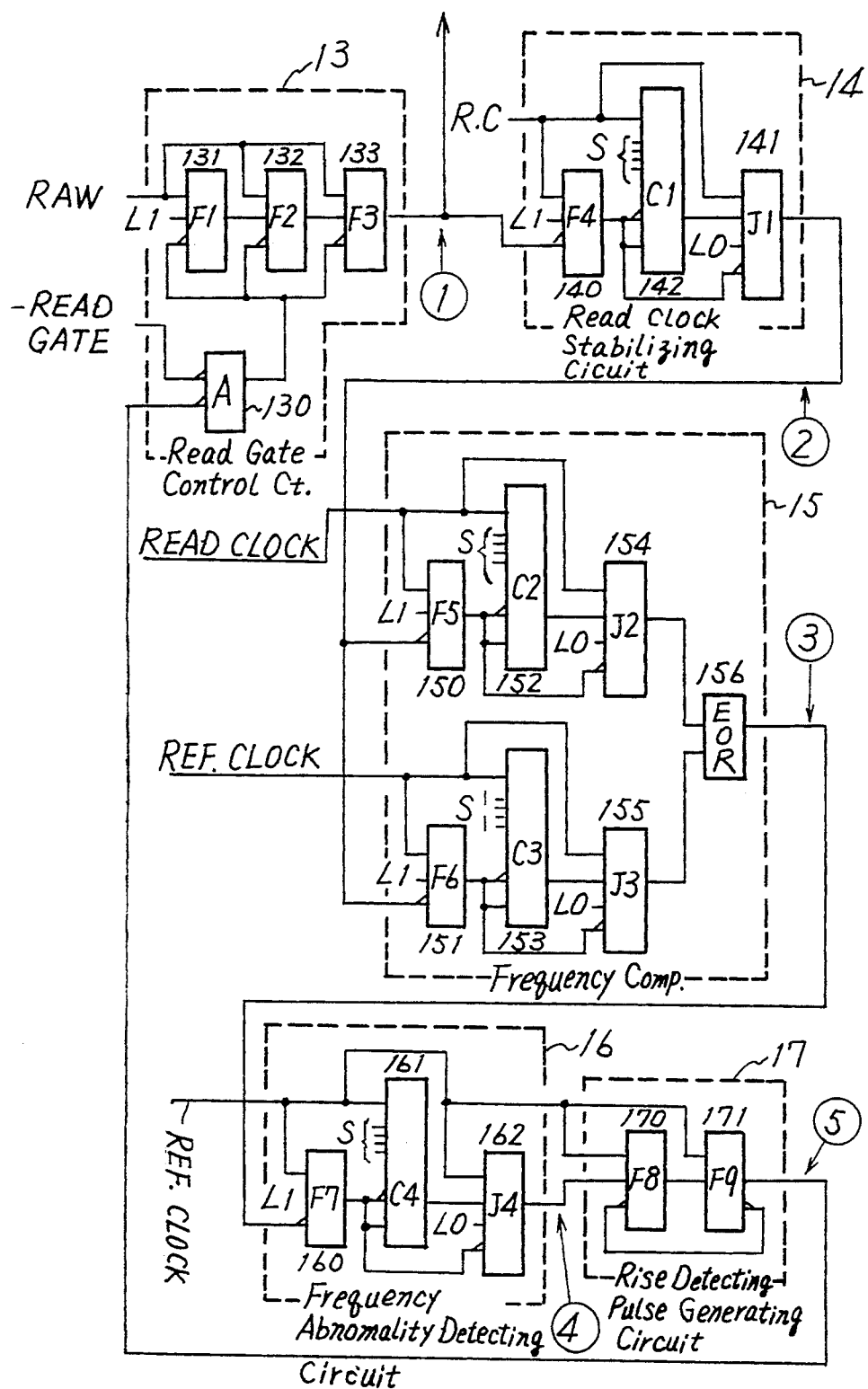
FIG. 9 shows in detail the arrangement of each block in FIG. 8.

FIG. 9 shows in detail the arrangement of each block in FIG. 8 while clarifying the connection relationship between the blocks.

Figure 10:
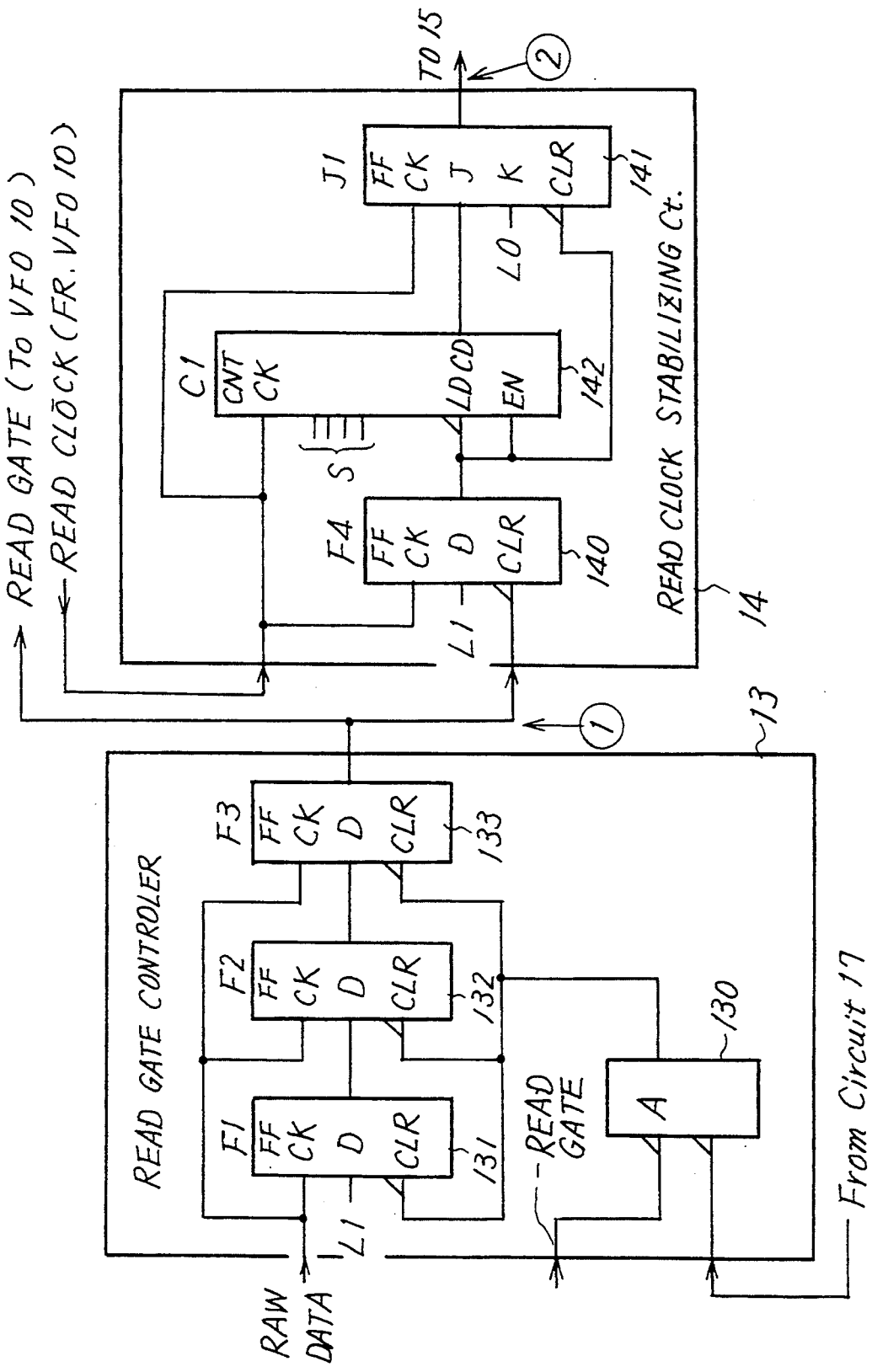
FIG. 10 is a detailed block diagram of a read-gate control circuit and read clock stabilizing circuit, shown in FIG. 9.

As shown in FIG. 10, the read-gate control circuit 13 is provided with an AND gate 130, and F1, F2 and F3 D-FFs 131, 132, and 133. The F1 D-FF 131 is fed with RAW data.

The AND gate 130 is fed with a first read-gate signal (-READ GATE) and an output signal from the rise detecting pulse generating circuit 17.

The D-FF(F3) 133 outputs the read-gate signal ① (READ GATE), which is transferred to the VFO 10 and the read clock stabilizing circuit 14.

The read clock stabilizing circuit 14 is provided with an D-FF(F4) 140, a JK-FF(J1) 141, and a counter (C1) 142. The D-FF(F4) 140 is fed with the read-gate signal ① and the read clock (READ CLOCK) from the VFO 10. The counter (C1) 142 is also fed with the read clock from the VFO 10.

Figure 11:
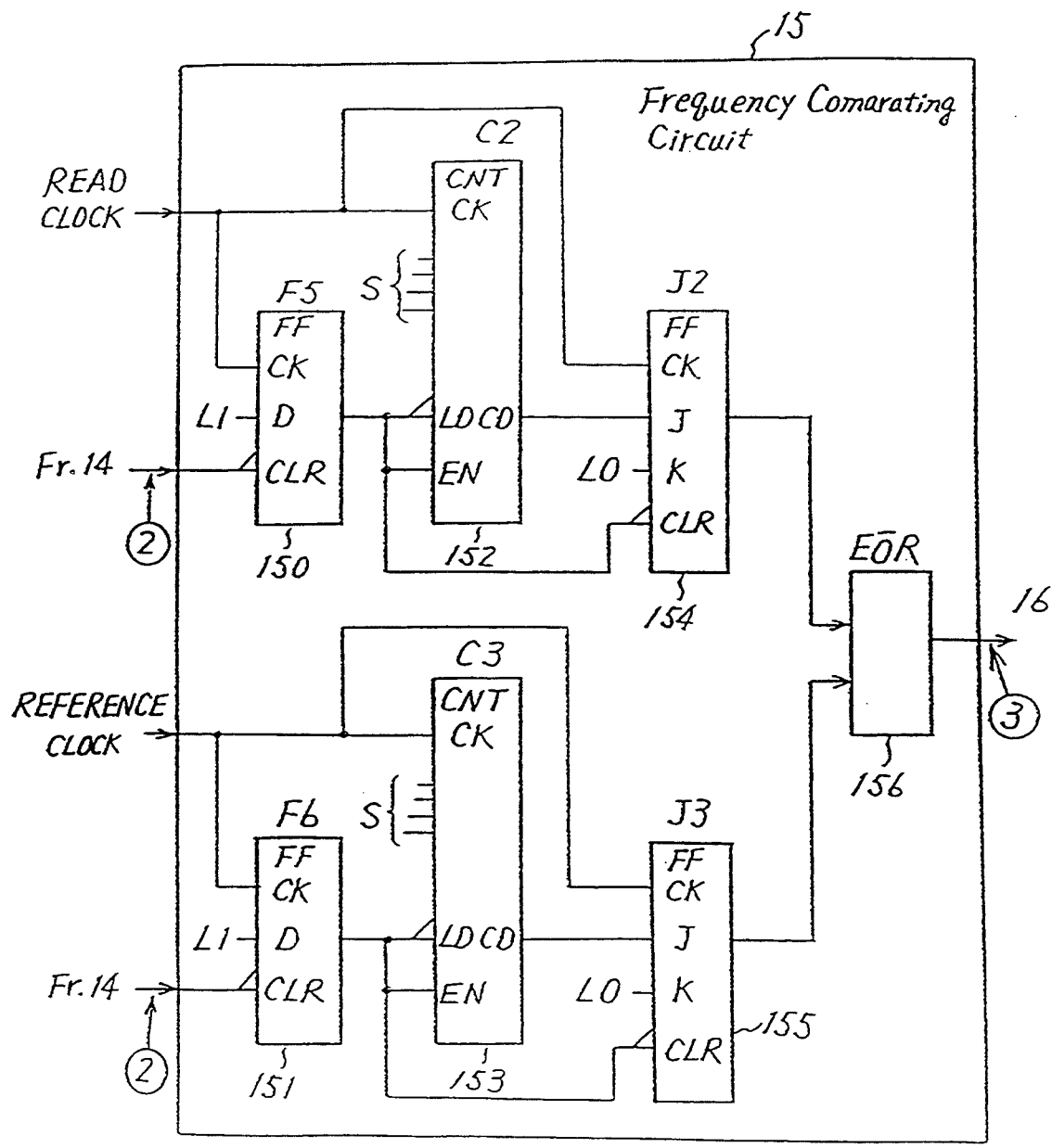
FIG. 11 is a detailed block diagram of a frequency comparator circuit shown in FIG. 9.

The signal ② output from the JK-FF(J1) is transferred to the frequency comparator circuit 15, shown in FIG. 11.

The frequency comparator circuit 15 is provided with D-FF(F5 and F6) 150 and 151, counters(C2 and C3) 152 and 153, JK-FFs(J2 and J3) 154 and 155, and an exclusive-or gate (EOR) 156.

The D-FF(F5) 150 is fed with the read clock (READ CLOCK) from the VFO 10 and the signal ② output from the read clock stabilizing circuit 14. The D-FF(F6) 151 is fed with the reference clock (REFERENCE CLOCK) from the read circuit 5 and the signal ② output from the read clock stabilizing circuit 14.

The counter(C2) 152 is fed with the read clock, while the counter(C3) 153 is fed with the reference clock. The signal ③ output from the exclusive-or gate(EOR) 156 is transferred to the frequency abnormality detecting circuit 16, shown in FIG. 12.

The frequency abnormality detecting circuit 16 is provided with an D-FF(F7) 160, a counter(C4) 161, and a JK-FF(J4) 162.

The D-FF(F7) 160 is fed with the reference clock and the signal 3 output from the frequency comparator circuit 15. The counter(C4) 161 is fed with the reference clock. The signal 4 output from the J4 JK-FF 162 is transferred to a circuit 17 for generating a rise detecting pulse.

The generating circuit 17 is provided with D-FFs(F8 and F9) 170 and 171. The D-FF(F8) 170 is fed with the signal ④ output from the JK-FF(J4) 162 and the reference clock.

The signal ⑤ output from the D-FF(F9) 171 is transferred to the AND gate 130 in the read-gate control circuit 13. It should be noted that the counters(C1 to 142, 152, 153 and 161 are each provided with terminals S for external setting so that an initial value (target value) can be set to the counter by an external firmware.

By changing the values set through the external setting terminals B, the runaway detection sensitivity of the VFO 10 can be changed as desired.

The RAW data that is input to the read-gate control circuit 13 will be explained below.

The digitizing circuit 9, which is provided in the read circuit 5, shown in FIG. 7, converts the output of the differentiating circuit 7 into RAW data. At this time, a RAW data generating circuit that is shown at ① in FIG. 13 is employed.

This circuit comprises two comparators(CMP) 30 and 31, a flip-flop(FF) 32, and resistors R1 to R3. In this case, the resistors R1 to R3 have the same resistance.

Figure 13A:
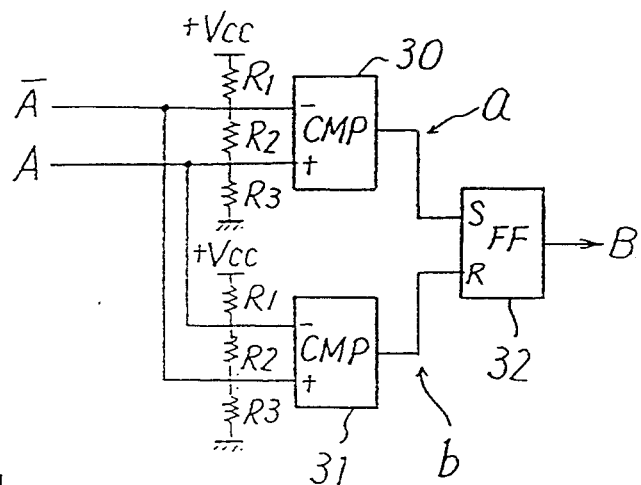
FIGS. 13a and 13b show one example of a RAW data generating circuit, together with waveforms in various portions of the circuit.
Figure 13B:
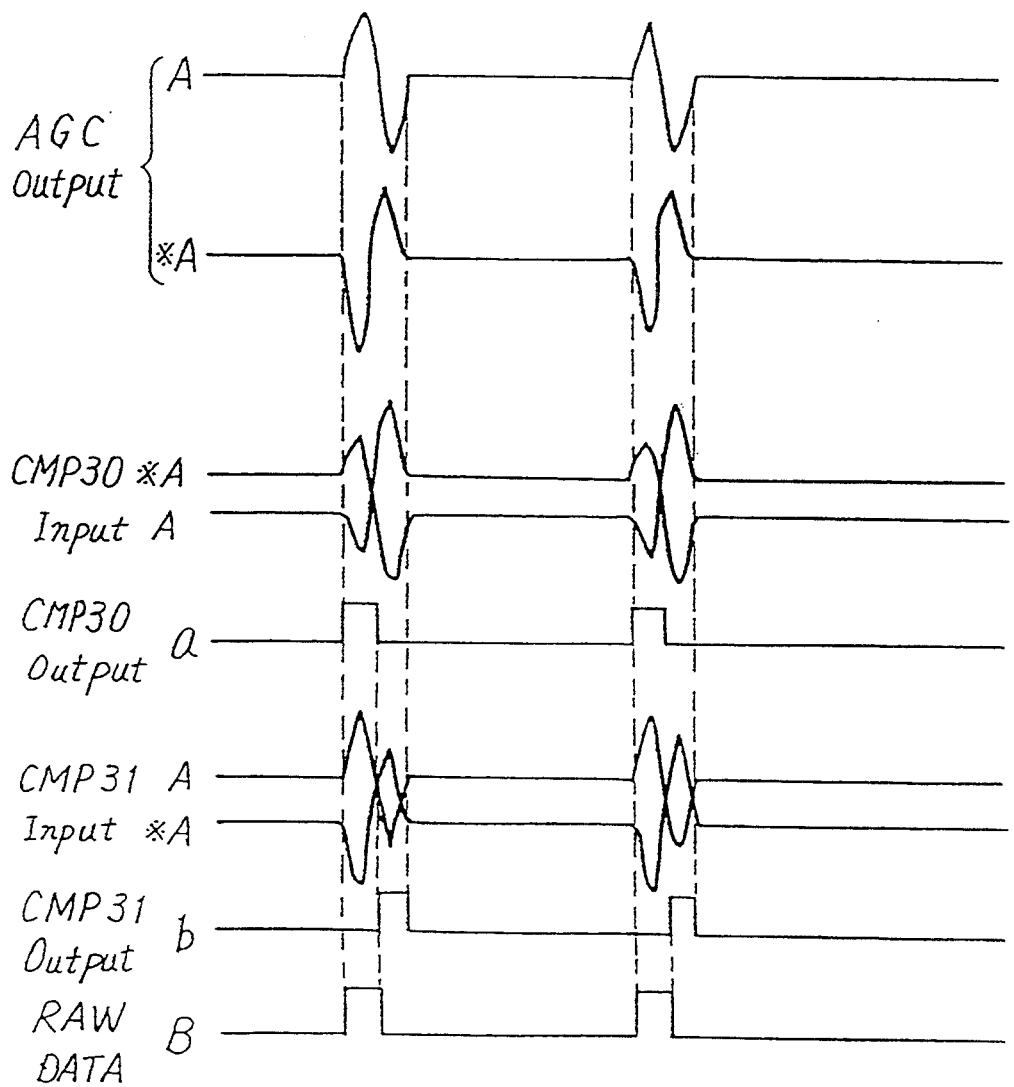

The output of the AGC circuit 8, that is, the signal input to the RAW data generating circuit 9, comprises a signal A and an inverted signal *A, which is opposite to the signal A, as shown at ② in FIG. 13.

The two signals are input to the comparators 30 and 31 in reversed polarity relation to each other and compared therein. As a result, pulse-shaped output signals appear at the output-side points a and b of the comparators 30 and 31 as shown at ② in FIG. 13.

The flip-flop 32 is set by the signal (pulse) obtained at the point a and reset by the signal obtained at the point b. As a result, pulse-shaped binary data (RAW data) is obtained as the output B, as shown at ② in FIG. 13.

The operation of the first embodiment of the present invention will be explained below with reference to the timing charts of FIGS. 14 and 15.

FIG. 14 is a timing chart showing an operation of the runaway detecting circuit 12 when VFO goes out of control, while FIG. 15 is a timing chart showing an operation of the runaway detecting circuit 12 when VFO normally operates.

In FIGS. 14 and 15, 1 to 5 respectively show the waveforms at the points 1 to 5 in FIGS. 8 to 12. In FIGS. 8 to 12, L1 represents a high-level signal, while L0 represents a low-level signal.

First, when the read-gate signal (-READ GATE) from the upper-level controller 6 is asserted, the read-gate control circuit 13 delays RAW data (binary data) representative of a VFO synchronizing pattern for a period of time corresponding to three pulses by the D-FFs(F1 to F3) 131, 132 and 133, and thereafter asserts the read-gate signal (READ GATE) which is to be transferred to the VFO 10 (see ① in FIGS. 9, 14 and 15).

In the read clock stabilizing circuit 14, since the read clock (READ CLOCK output from the VFO 10) immediately after the read-gate signal 1 (READ GATE) to be transferred to the VFO 10 has been asserted is not used, the signal 2 output from the read clock stabilizing circuit 14 is asserted after several read clock pulses have been counted in the counter (C1) 142.

In the read clock stabilizing circuit 14, after the read-gate signal ① (read-gate signal to be transferred to the VFO 10) has been asserted, L1 (high-level signal) is latched in the D-FF(F4) 140 by the read clock (READ CLOCK) and used as an enable (EN) signal for the counter (C1) 142.

At this time, the counter (C1) 142 counts read clock pulses up to a count value externally set through the terminals S and outputs a count-up signal when the set count value is reached. The JK-FF(J1) 141 latches the count-up signal from the counter (C1) 142 and asserts the signal 2. The frequency comparator circuit 15 and the frequency abnormality detecting circuit 16 similarly have respective circuits each comprising a combination of D-FF, counter, and JK-FF. These circuits operate in the same way as the above-described circuit, which constitutes the read clock stabilizing circuit 14. Accordingly, explanation of these circuits is omitted.

In the frequency comparator circuit 15, when the signal ② output from the read clock stabilizing circuit 14 is asserted, that is, when the VFO 10 has been synchronized with the RAW data and several read clock pulses have been counted in the read clock stabilizing circuit 14 (see FIGS. 14 and 15), leading edges of reference (REFERENCE) and read clock (READ CLOCK) pulses are counted up to the respective set count values, and count-up signals are latched by the JK-FFs(J2 and J3) 154 and 155, respectively.

If there is a frequency difference (that is, if there is a time difference between the two points of count-up timing), a synchronization comparison is made to detect a difference, that is, a count-up time difference is detected by the exclusive-or circuit(EOR) 156, and the signal ③ is asserted for a period time corresponding to the time difference (see ③ in FIG. 14).

In actuality, when the VFO 10 goes out of control, the effective time period of the signal ③ becomes relatively long, whereas, when the VFO 10 is in a normal state, the signal ③ is not asserted substantially, that is, the effective time period of the signal 3 is relatively short. There are cases where the signal 3 appears in the form of a hazard (see ③ in FIG. 15).

By changing the counter set value externally through the terminals S of the counter (C2) 152, the effective time period of the signal ③ (output from the EOR 156) can be controlled as desired.

In the frequency abnormality detecting circuit 16, a length of time that the signal ③ output from the frequency comparator circuit 15 is asserted is measured by using the reference clock (REFERENCE CLOCK).

If the signal ③ is asserted for a longer period than the target value initially set to the counter (C4) 161 of the frequency abnormality detecting circuit 16, that is, if the VFO 10 goes out of control, the counter (C4) 161 delivers a count-up signal, which is latched by the JK-FF(J4) 162, so that the signal ④ is asserted (see ④ in FIG. 14).

When the signal ③ is asserted for a shorter period than the target value initially set to the counter (C4) 161, the counter (C4) 161 cannot count up to the target value, so that the output of the JK-FF(J4) 162 is kept negated (see ④ in FIG. 15).

By changing the counter set value externally through the terminals S of the counter (C4) 161, the count-up timing can be changed as desired. Thus, the detection sensitivity of the frequency abnormality detecting circuit 16 can be controlled as desired.

In the rise detecting pulse generating circuit 17, if the signal ④ output from the frequency abnormality detecting circuit 16 is asserted, that is, if the VFO 10 has gone out of control, the leading edge of the signal 4 is detected, and a pulse ⑤ having a width corresponding to one period of the reference clock is generated. With the pulse ⑤, the D-FFs(F1 to F3) 131,132 and 133 in the read-gate control circuit 13 are reset to negate the signal ① (read-gate signal transferred to the VFO 10) which has been asserted so far.

Further, when the signal ① is negated, the read clock stabilizing circuit 14, the frequency comparator circuit 15 and the frequency abnormality detecting circuit 16 are each reset immediately to return to the initial state.

On the other hand, when the VFO 10 is in a normal state, no pulse is generated in the rise detecting pulse generating circuit 17 as shown at ⑤ in FIG. 15. Therefore, the read-gate signal ① (read-gate signal transferred to the VFO 10) remains asserted.

When the VFO 10 goes out of control, the D-FFs(F1 to F3) 131,132 and 133 in the read-gate control circuit 13, together with the read clock stabilizing circuit 14, the frequency comparator circuit 15 and the frequency abnormality detecting circuit 16, are reset. Consequently, the output pulse from the rise detecting pulse generating circuit 17 is negated after a period of time corresponding to one period of the reference clock (⑤ in FIG. 14). Accordingly, the cleared state of the D-FFs(F1 to F3) 131, 132 and 133 in the read-gate control circuit 13 is negated immediately.

If the read-gate signal (-READ GATE) from the upper-level controller 6 is still asserted at this time, a retry of synchronizing operation in the VFO is enabled immediately (see ① in FIG. 14).

Thus, the frequency comparator circuit 15 makes a comparison between the read clock (READ CLOCK) output from the VFO 10 and the reference clock (REFERENCE CLOCK) and outputs a pulse (③ in FIG. 14) corresponding to the size of the difference between the clocks. The size of the difference is compared with the initial set value in the frequency abnormality detecting circuit 16.

If the difference is larger than the initial set value, it is decided that the VFO 10 has gone out of control, and the signal ④ is asserted. Then, a pulse ⑤ having a width corresponding to one period of the reference clock is generated. Thus, the read-gate signal (READ GATE) transferred to the VFO 10 can be negated.

When the read clock from the VFO 10 is in a normal state, the read-gate signal ① (READ GATE) transferred to the VFO 10 is not negated until the read-gate signal (-READ GATE) from the upper-level controller 6 is negated. Therefore, data can be read in the read circuit 5 as expected.

Figure 3:
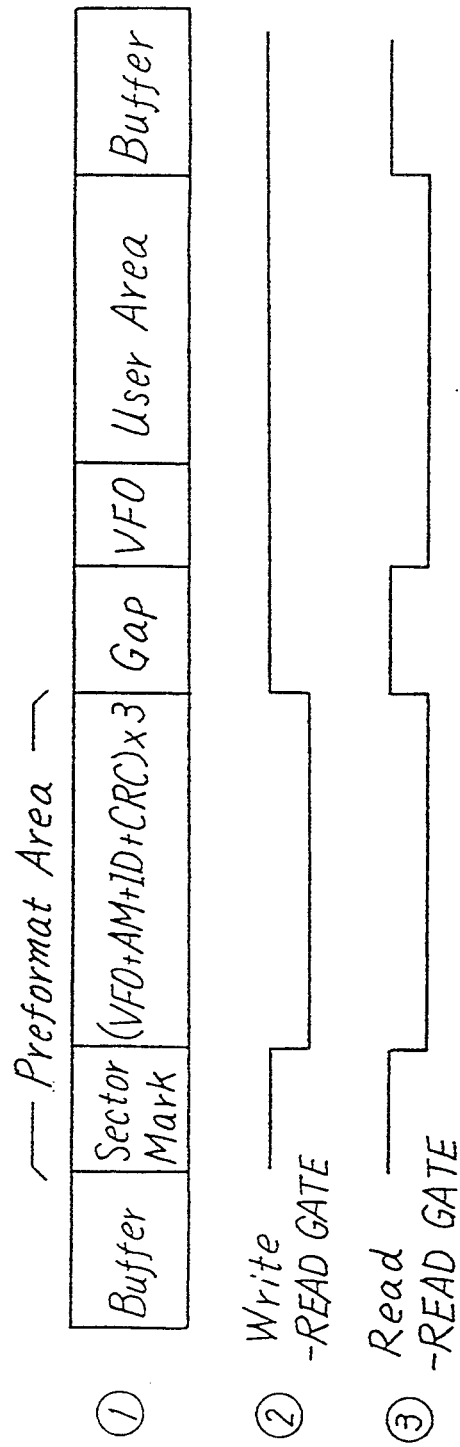
FIG. 3 shows one example of the disk data format.
Figure 4:
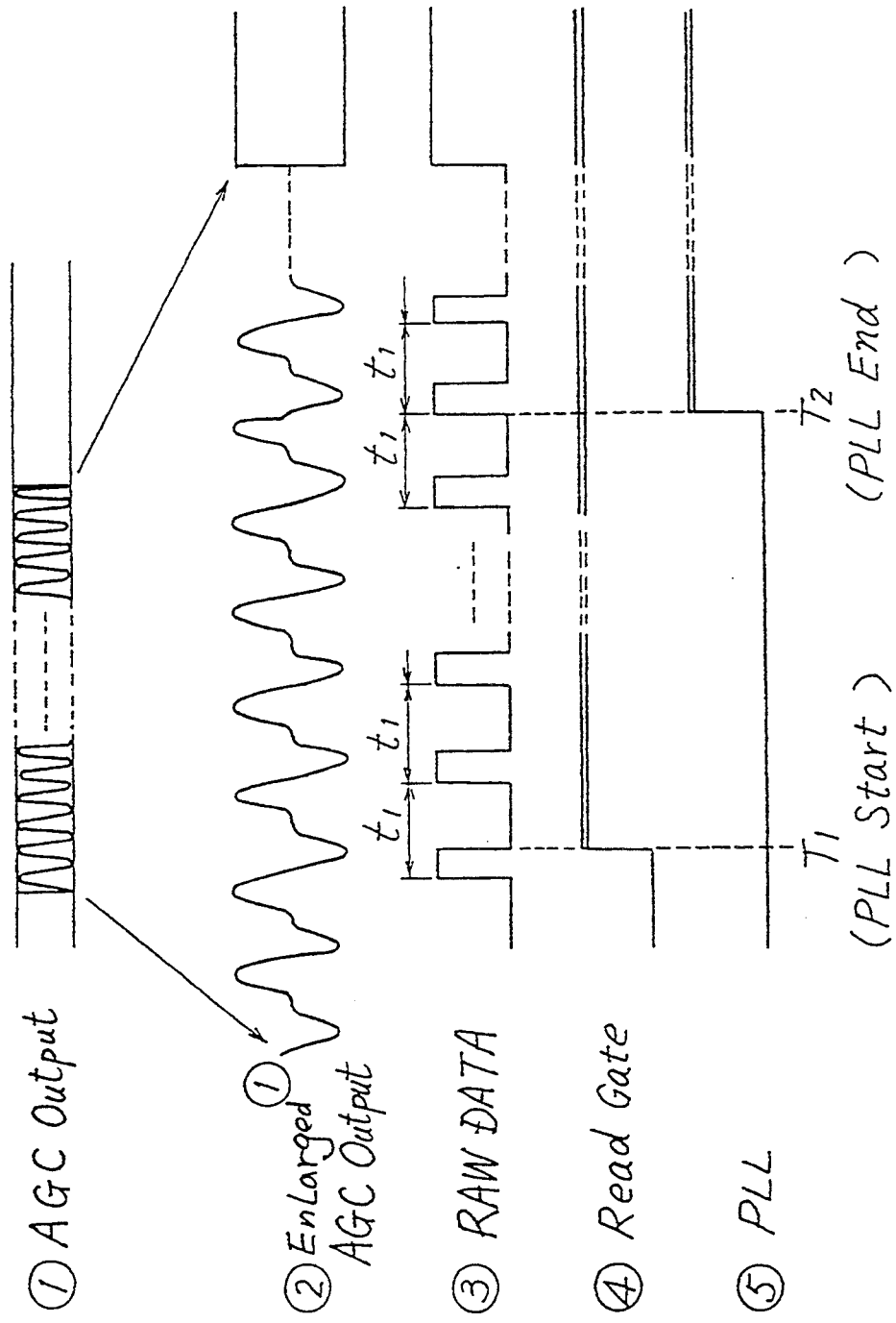
FIG. 4 is a view for explanation of a VFO operation in a state where PLL pulling can be effected.
Figure 5:
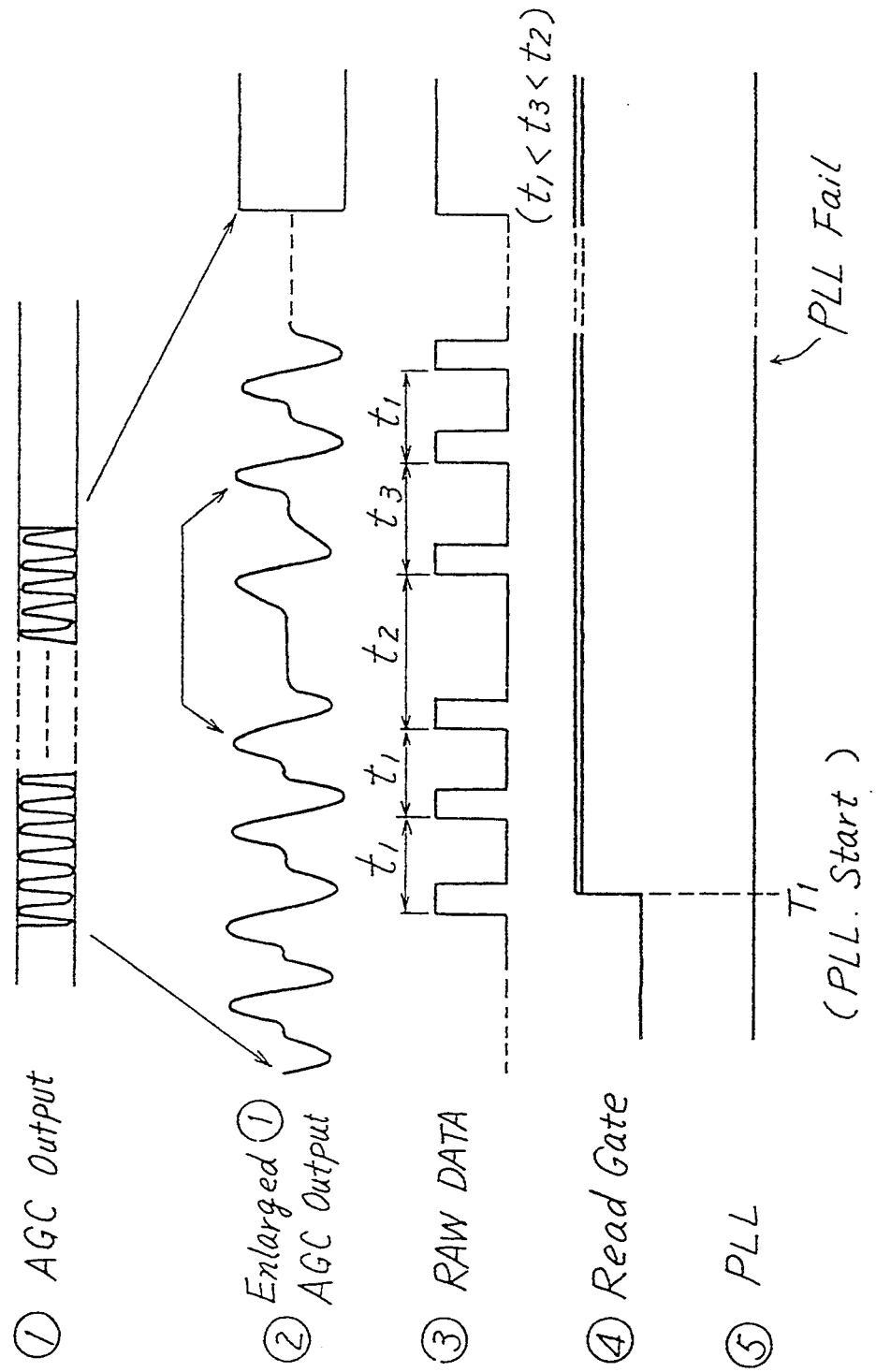
FIG. 5 is a view for explanation of a VFO operation in a state where PLL pulling cannot be effected.

It should be noted that detection of runaway of the VFO 10 (runaway of the read clock) is carried out on two different occasions, that is, when an ID region is read by detecting a VFO synchronizing pattern, which is RAW data, in a VFO synchronizing zone in the preformat area, shown at 1 in FIG. 3, and when a data region is read by detecting a synchronizing pattern in the VFO synchronizing zone, which precedes the data region in the user area.

In other words, VFO runaway is detected for the ID region and for the data region.

Although the first embodiment of the present invention has been described above, the apparatus of the embodiment may also be carried out as follows:

(1) The arrangement of the embodiment may also applied to read-only optical and magnetic disk apparatus in addition to optical and magnetic disk apparatus capable of writing and reading data to and from a disk.

(2) The upper-level controller 6, shown in FIG. 6, may be installed separately from the optical disk apparatus 20.

(3) The arrangement of the embodiment may also be applied to other data format than that shown at 1 in FIG. 3.

As has been described above, the above-described embodiment provides the following advantageous effects:

(1) When the read clock generated from VFO goes out of control, the read-gate signal is immediately negated. Therefore, when the read clock goes out of control at the first synchronizing zone in the preformat area on a disk (medium), the necessary read clock can be generated from the second and third VFO synchronizing zones.

Accordingly, it is possible to reduce the incidence of ID region read errors and hence possible to reduce the number of times of retry and shorten the seek time.

(2) There is no possibility that the data region (user data region) will be read with a read clock which has gone out of control. Accordingly, the readout data and the data reproducing system improve in reliability.

Figure 16:
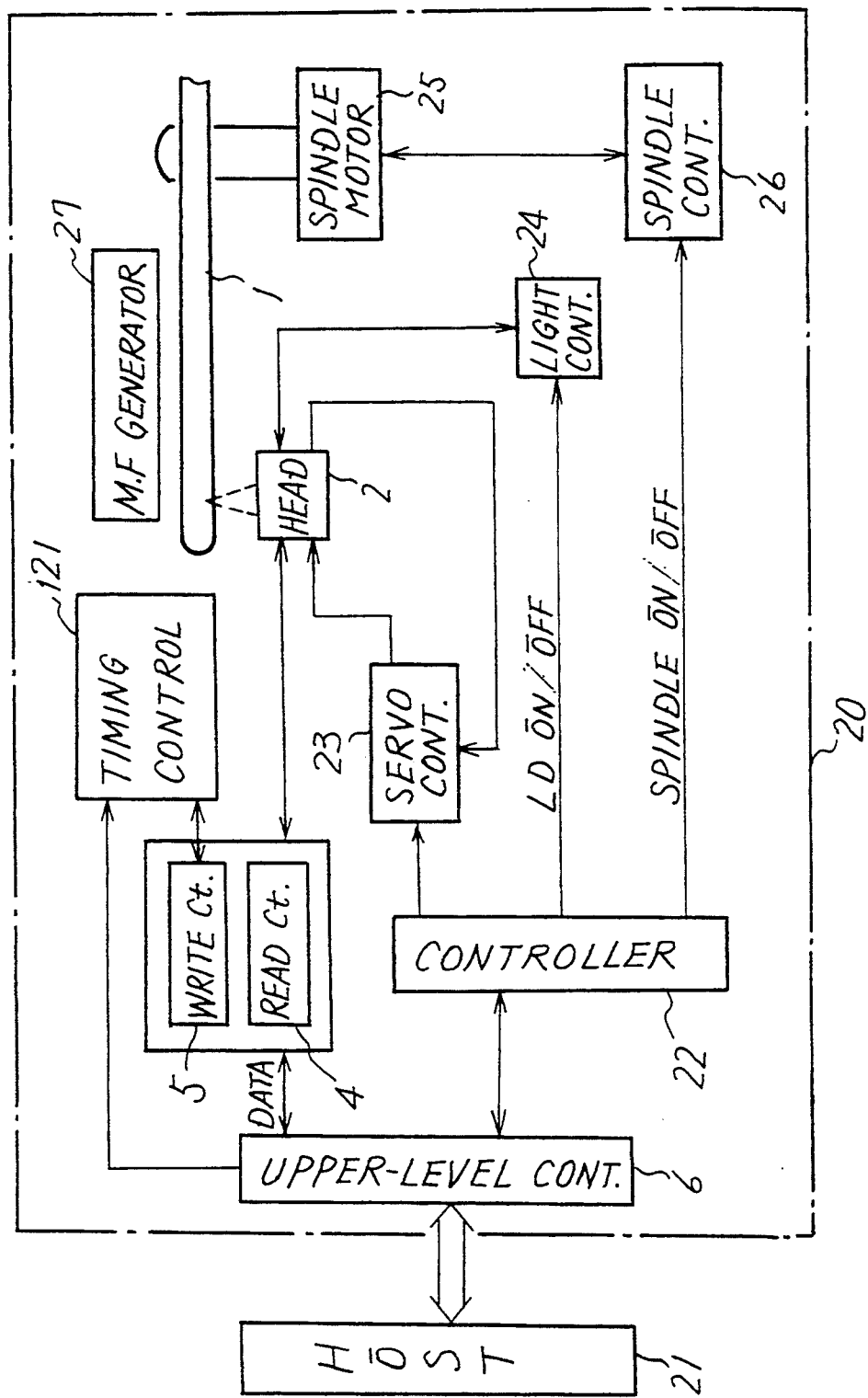
FIG. 16 is a block diagram of an optical disk apparatus according to a second embodiment of the present invention.

FIG. 16 is a block diagram showing the arrangement of an optical disk apparatus according to a second embodiment of the present invention. The basic arrangement of this embodiment is the same as that of the first embodiment, shown in FIG. 6. However, the second embodiment differs from the first embodiment in that a timing control circuit 121 is provided in place of the runaway detecting circuit 12.

In the first embodiment, when runaway of the VFO 10 is detected in the runaway detecting circuit 12, each circuit is immediately reset to the initial state. Then, a retry of synchronizing operation on the basis of a VFO synchronizing pattern is immediately executed. Thus, it is possible to prevent the data read operation from continuing with the read clock which has gone out of control, which would otherwise lead to a read error.

In contrast, the second embodiment, shown in FIG. 16, is arranged such that the read-gate generating timing is controlled so as to shift for each retry operation of phase locking, thereby increasing the probability of pulling being effected successfully in the VFO 10.

Accordingly, in the disk apparatus according to the present invention, the first and second embodiments can be applied either separately or simultaneously. That is, in the application of the first embodiment, the disk apparatus can be arranged such that when a retry operation of synchronizing on the basis of a VFO synchronizing pattern is carried out, the read-gate generating timing is controlled to shift so as to delay by application of the second embodiment.

The contents of the second embodiment of the present invention will be explained in due order below with reference to the drawings.

Figure 17:
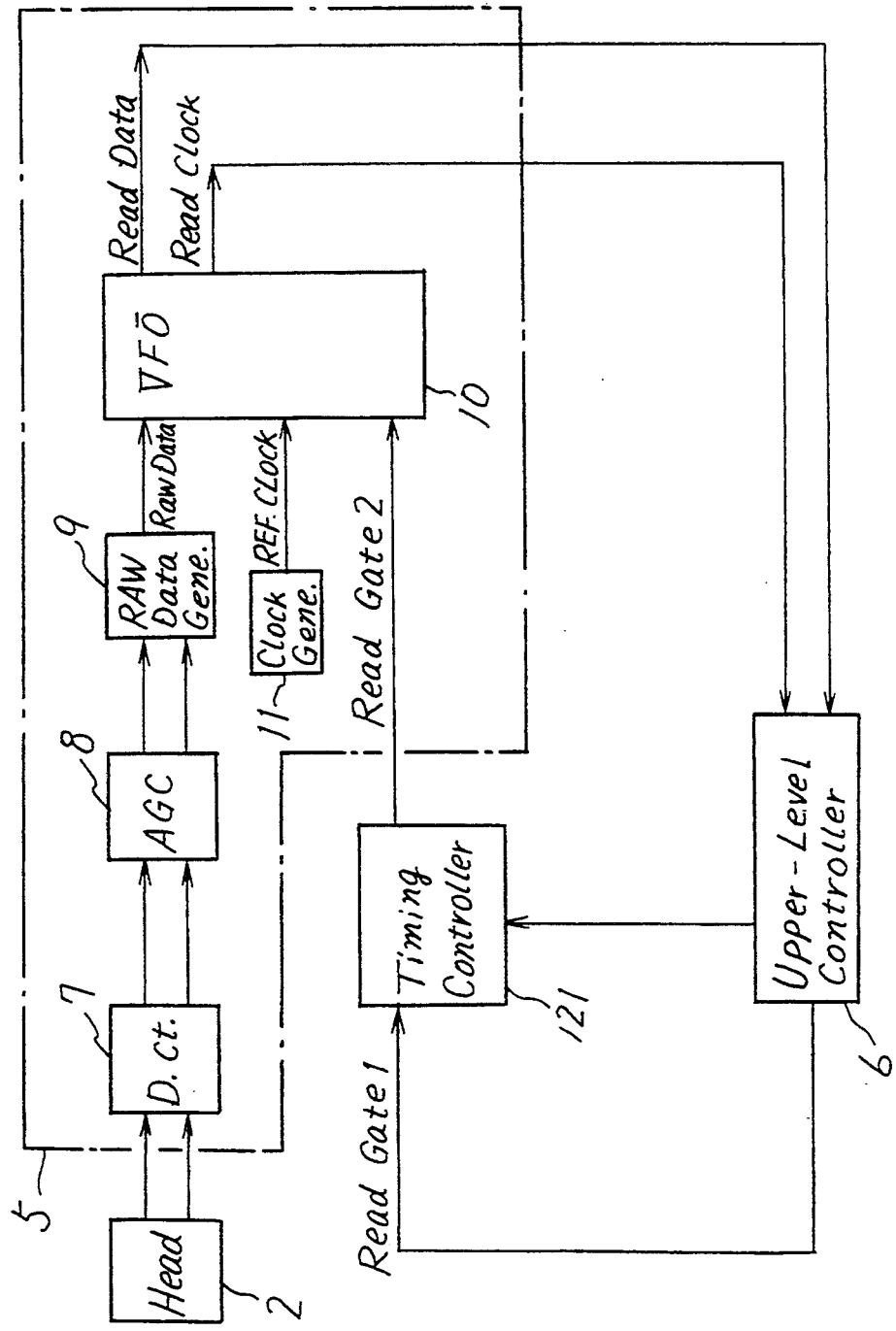
FIG. 17 is a detailed block diagram of a read circuit shown in FIG. 16.

FIG. 17 is a block diagram illustrating the details of the read circuit 5 and also showing the relationship between the timing control circuit 121 and the upper-level controller 6. The arrangement of the read circuit 5 is similar to that shown in FIG. 7. That is, the read circuit 5 is provided with a differentiating circuit 7, an AGC circuit 8, a RAW data generating circuit 9, a reference clock generator 11, and a VFO 10, as illustrated.

The VFO 10 receives binary data (RAW data) from the digitizing circuit 9, a reference clock from the reference clock generator 11, and a read-gate signal 2 from the timing control circuit 121, and outputs two signals, that is, read data (READ DATA) and a read clock (READ CLOCK), to the upper-level controller 6.

In this case, the timing control circuit 121 receives a read-gate signal (READ GATE 1) and a retry instruction from the upper-level controller 6, converts the read-gate signal into another read-gate signal (READ GATE 2), and outputs it to the VFO 10. The retry signal is generated when a retry operation for phase locking is needed, for example, when the synchronizing operation of the VFO 10 has gone out of control, or when a read error has occurred.

Figure 18:
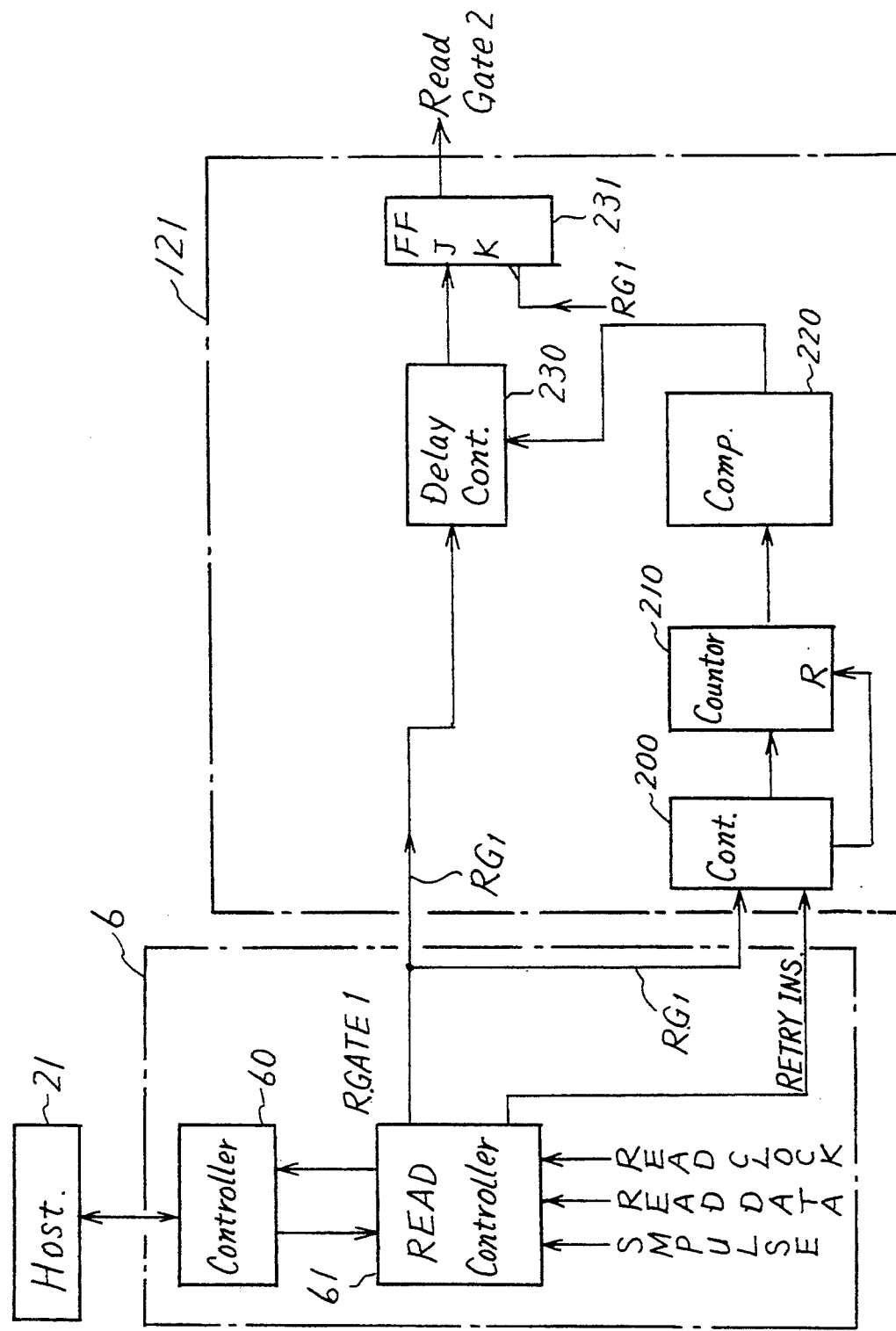
FIG. 18 is a detailed block diagram of an upper-level controller and timing control circuit, shown in FIG. 16.

FIG. 18 shows the details of the upper-level controller and the timing control circuit 121 and the relationship between the upper-level controller 6 and the host computer 21. As illustrated, the upper-level controller 6 is provided with a controller 60 and a read controller 61, and the timing control circuit 121 is provided with a delay controller 230, a controller 200, a counter 210, and a numerical comparator 220.

The upper-level controller 6 and timing control circuit 121, arranged as described above, operate as follows.

In this embodiment, the timing control circuit 121 receives a read-gate signal (Read Gate 1) and a retry instruction from the upper-level controller 6, generates another read-gate signal (Read Gate 2) and outputs it to the VFO 10.

In this case, in the upper-level controller 6 the controller 60 receives a read instruction from the host computer 21 and sends information for reading to the read controller 61.

On receipt of a sector mark detecting pulse (hereinafter referred to as "SM pulse") included in the data format, shown in FIG. 3, from the optical head 2, the read controller 61 reads an ID region and asserts the read-gate signal (Read Gate) at the VFO region in the user data.

In other words, the read controller 61 inputs the read-gate signal (Read Gate 1) and the retry instruction signal to the timing control circuit 121.

In this embodiment, the timing control circuit 121 comprises a controller 200, a counter 210, a numerical comparator 220, a delay controller 230, and a JK-FF 231.

Figure 19:
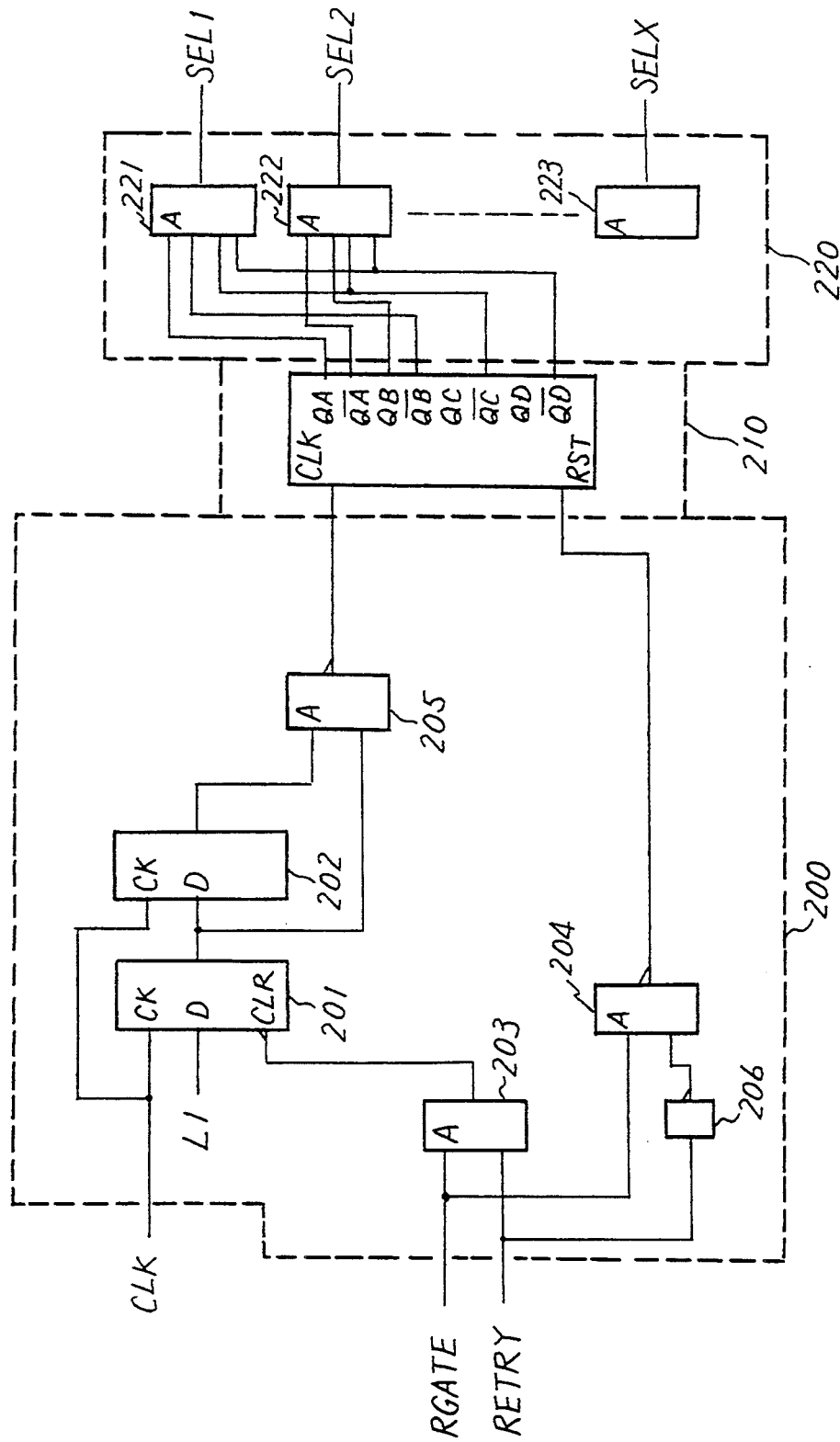
FIG. 19 is a detailed block diagram showing examples of the arrangements of a controller, counter and numerical comparator in the timing control circuit shown in FIG. 18.
Figure 20:
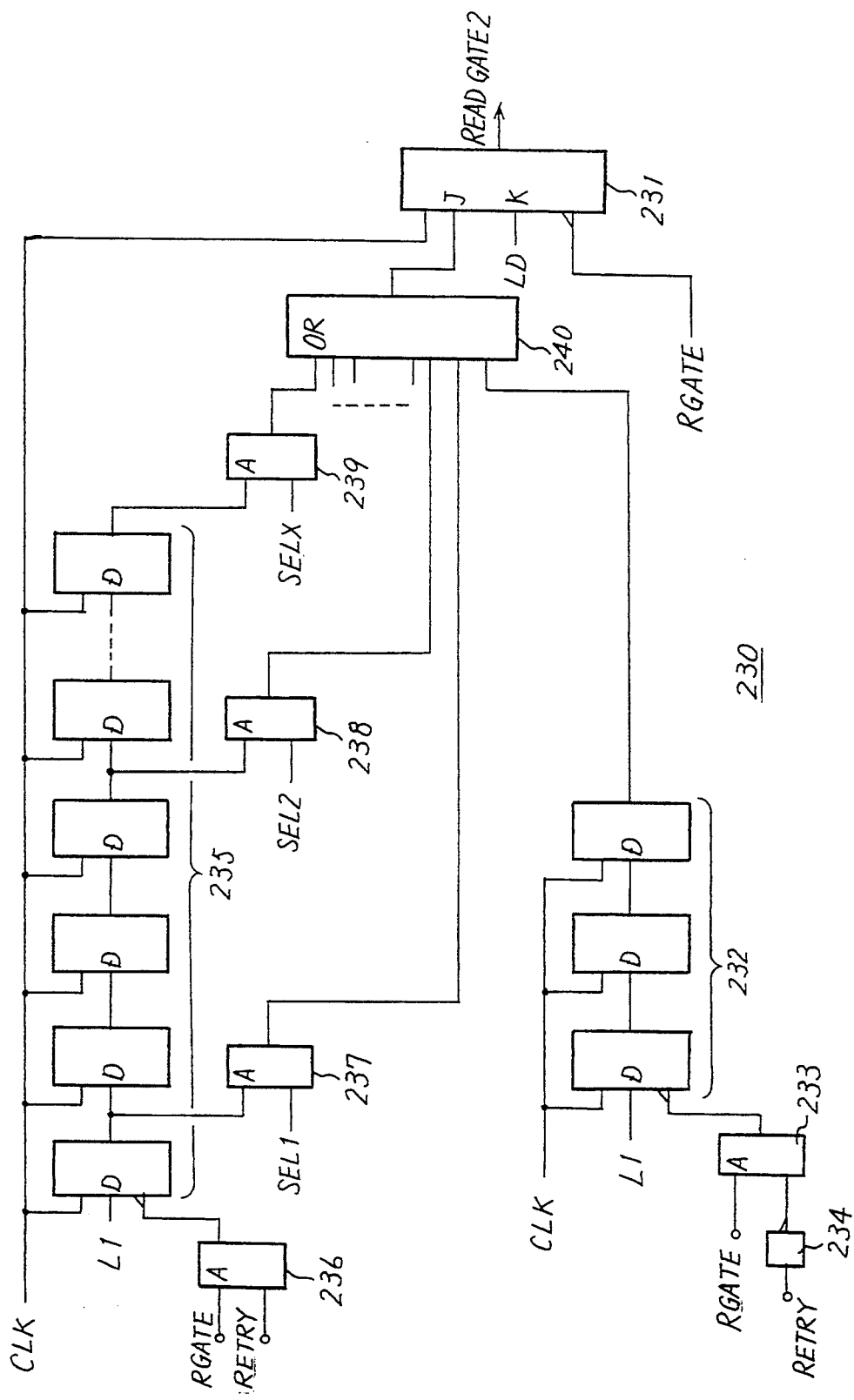
FIG. 20 is a detailed block diagram showing one example of a delay controller in the timing control circuit shown in FIG. 18.

The details of each part in the timing control circuit 121 are shown in FIGS. 19 and 20.

FIG. 19 is a block diagram showing in detail the controller 200, the counter 210 and the numerical comparator 220. The controller 200 comprises D-FFs 201 and 202, AND gates 203, 204 and 205, and an inverter 206. With this arrangement, the controller 200 generates one pulse for each retry on the basis of the read-gate signal (Read Gate 1) and retry instruction signal (RETRY) sent from the upper-level controller 6, and inputs the pulse to the clock gate of the counter 210. Accordingly, the counter 210 increments the count value by one for each retry, thereby counting the number of retries attempted.

The numerical comparator 220 has a predetermined number of AND gates 221 to 223, which are connected to the counter 210 so that each AND gate delivers an output when the value of the counter 210 reaches a predetermined value. Accordingly, the AND gates 221 to 223 output select signals SEL1, SEL2 and SELX for controlling the delay quantity in the delay controller 230 in correspondence to the respective predetermined count values.

FIG. 20 shows the details of the delay controller 230 and the JK-FF 231. The delay controller 230 comprises FF circuits 232 and 235, each comprising a predetermined number of stages of D-FFs, AND gates 233 and 236 to 239, an inverter 234, and an OR gate 240.

In the delay controller 230, the FF circuit 232, the AND gate 233 and the inverter 234 generate a read-gate signal in a normal state. When a retry signal (RETRY) is generated, a delay quantity is determined in the FF circuit 235 on the basis of the select signals SEL1, SEL2 and SELX from the numerical comparator 220 to thereby generate a read-gate signal. The read-gate signals from the FF circuits 232 and 235 are led to the OR gate 240.

Further, the output of the OR gate 240 is input to the JK-FF 231, which functions as a read-gate generator. The JK-FF 231 sets the read-gate signal (Read Gate 2) in response to the rise of the output of the OR gate 240 and resets it in response to the fall of the output.

Figure 21:
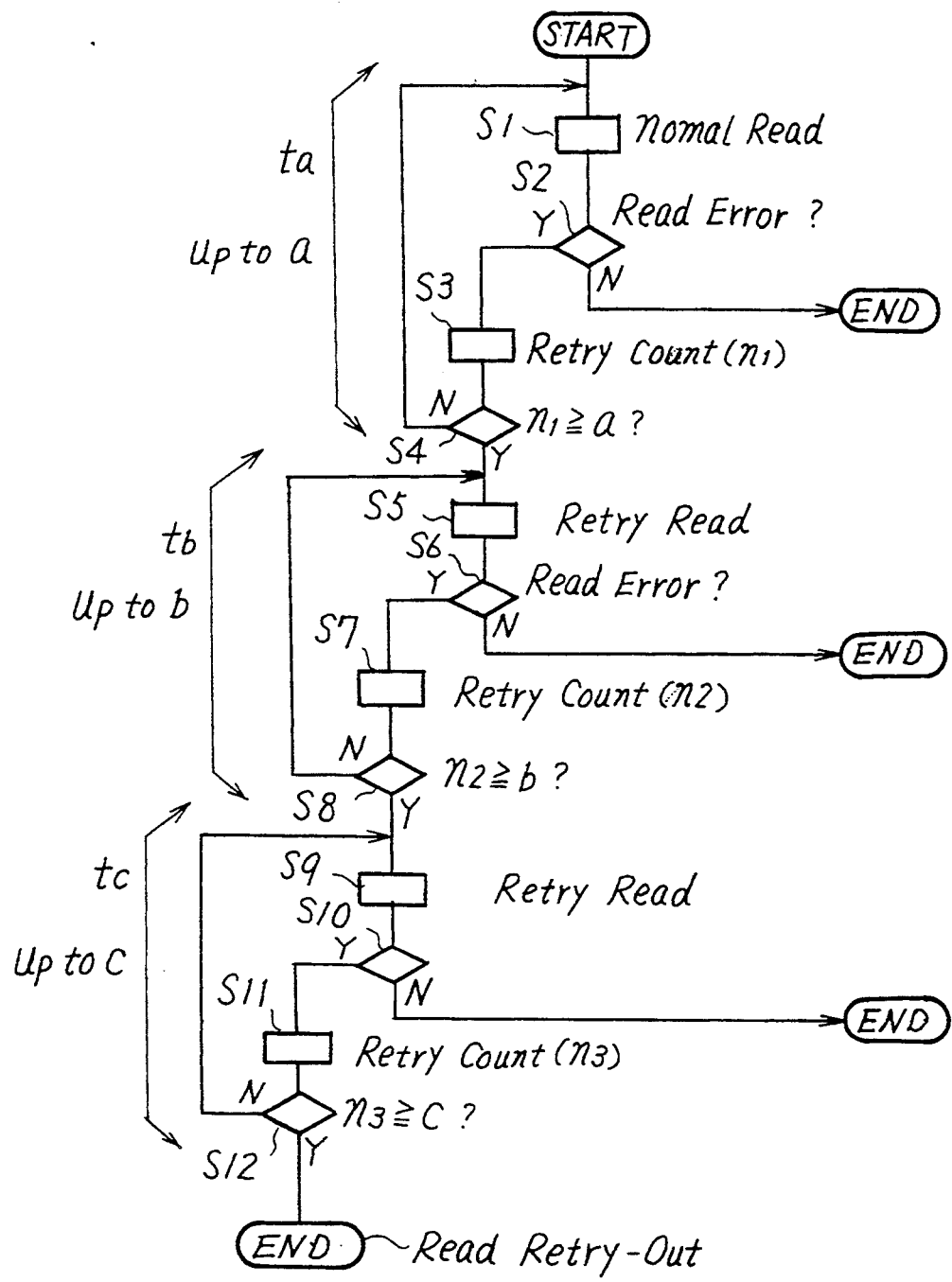
FIG. 21 is a flowchart showing retry processing.

The retry processing executed by the upper-level controller 6 and timing control circuit 121, arranged as described above, will be explained below with reference to FIGS. 21 and 22. It should be noted that each processing step No. in the flowchart of FIG. 21 is shown in parentheses.

In this embodiment, the retry processing is repeatedly executed with the delay quantity in the timing control circuit 121 varied such that the delay quantity is first ta (processing at Steps S1 to S4), then tb (processing at Steps S5 to S8), and then tc (processing at Steps S9 to S12).

First, the retry processing is repeated up to a times with the delay quantity ta. Then, it is repeated up to b times with the delay quantity tb. Then, it is repeated up to c times with the delay quantity tc. In this embodiment, the relationship between the delay quantities is set to be tc<ta<tb.

During each retry, the emission power of the light source, the amplitude of the output signal from the AGC circuit, the slice level of the digitizing circuit, etc. are properly controlled.

If data can be read by the above-described processing, the process is terminated, whereas, if a read error is persistent to the end, "unreadable" is declared.

Figure 22:
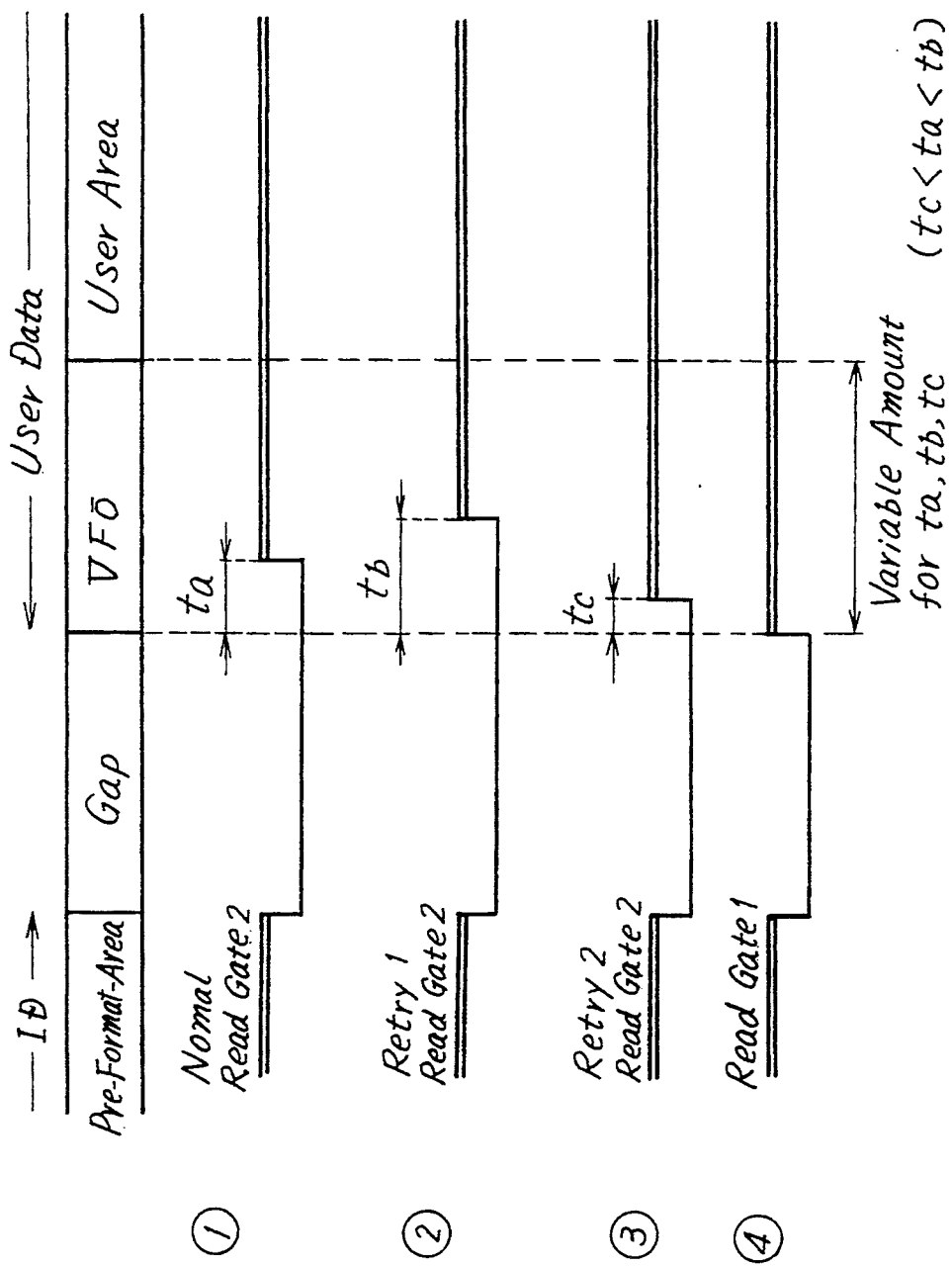
FIG. 22 is a view for explanation of the output timing of a read-gate signal during retry.

During the first normal read process, the timing control circuit 121 receives a read-gate signal (Read Gate 1) such as that shown at ④ in FIG. 22 from the upper-level controller 6 and outputs a read-gate signal (Read Gate 2) to the VFO 10 with a delay ta (see 1 in FIG. 22).

The VFO 10 executes a normal read operation (Step S1). If no read error occurs (Step S2), the process is brought to a normal termination.

However, if a read error occurs, a retry is executed. The timing control circuit 121 counts the number of retries (Step S3) by the counter 210. The retry is repeated up to a times(n1≧a) (Step S4).

During the retry repeated up to a times, the read operation is repeated with the LD emission power, the AGC output amplitude, the digitizing circuit slice level, etc. being controlled.

If the read operation is normally effected during the retry processing, the process is terminated.

If another read error occurs during the retry processing, a retry is attempted once more. In this case, the timing control circuit 121 receives the read-gate signal (Read Gate 1) from the upper-level controller 6 and outputs the read-gate signal (Read Gate 2) to the VFO 10 with a delay tb (see ② in FIG. 22).

At this time, reading during retry is executed (Step S5). If a read error occurs again (Step S6), the number of retries is counted (Step S7), and the retry processing is repeated up to b times(n2≧b) (Step S8).

During this retry operation also, the processing is repeated with the LD emission power, the AGC output amplitude, the digitizing circuit slice level, etc. being controlled in the same way as the above. If the read operation is normally effected during this retry processing, the process is terminated.

However, if a read error is persistent even if the retry is repeated b times, the timing control circuit 121 receives the read-gate signal (Read Gate 1) from the upper-level controller 6 and outputs the read-gate signal (Read Gate 2) to the VFO 10 with a delay tc (see ③ in FIG. 22).

In this case also, reading during retry is executed (Step S9). If a read error occurs (Step S10), the number of retries is counted (Step S11). The retry processing is repeated up to c times (n3≧c) (Step S12).

During this retry operation also, the processing is repeated with the LD emission power, the AGC output amplitude, the digitizing circuit slice level, etc. being controlled in the same way as the above. If the read operation is normally effected during this retry processing, the process is terminated.

However, if reading cannot be effected even if the retry processing is repeated c times, retry out" is declared, and the block concerned is disabled in the same way as in the prior art.

Figure 23:
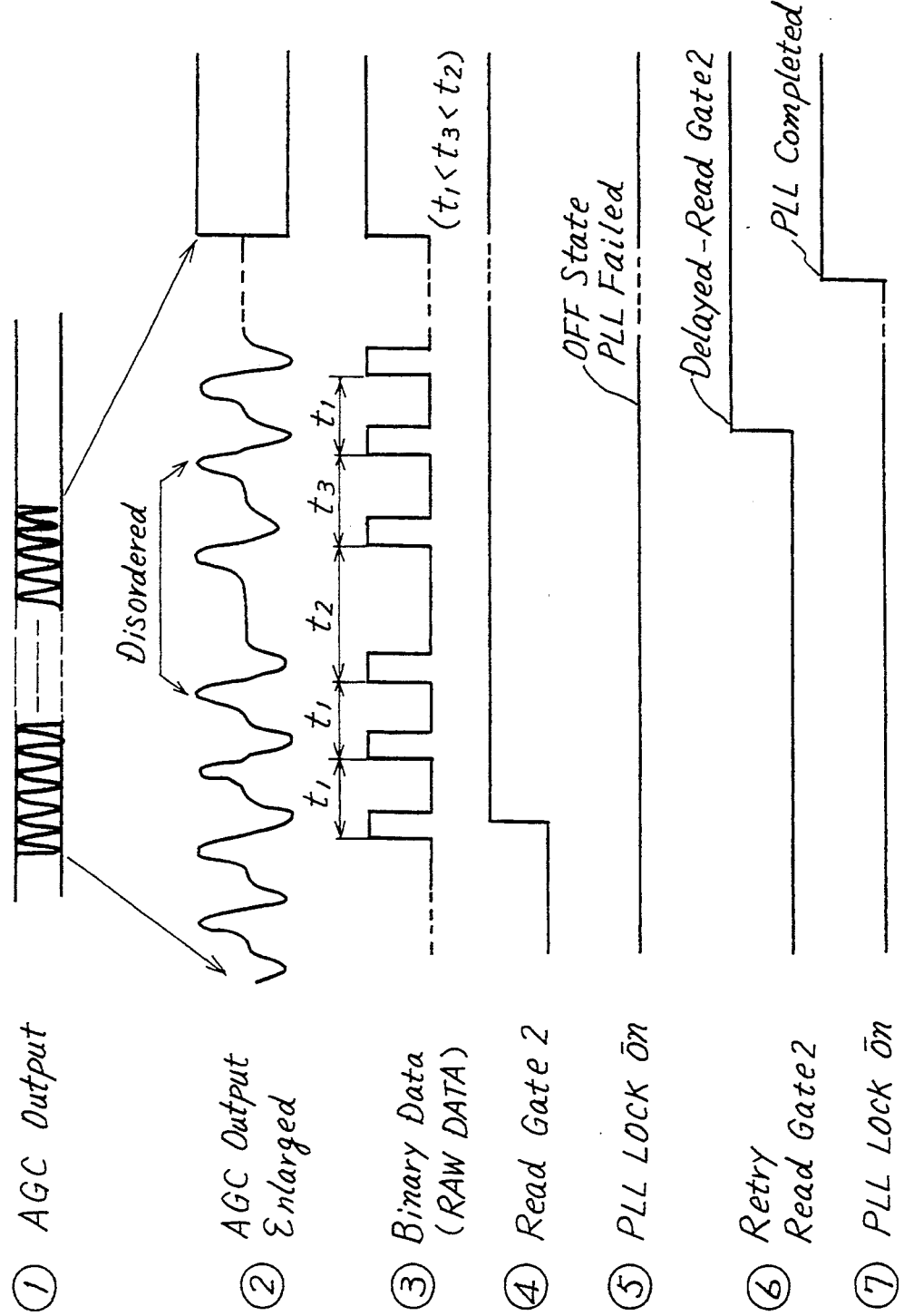
FIG. 23 is a timing chart (part 1) of a retry operation.

FIG. 23 shows an example of a condition that can be relieved by the retry processing. This example shows a case where the waveform of the output signal from the AGC circuit is disordered as shown at ① and ② in FIG. 23. The period of the binary data (RAW data), shown at ③, is also disordered as at t1, t2, t3 and t1.

This example shows a condition where the PLL in the VFO 10 that receives the normal read-gate signal (Read Gate 2) cannot effect phase locking with the VFO pattern (see ④ and ⑤), but phase locking is completed when the read-gate signal (Read Gate 2) is delayed so as to be received behind the normal timing (see ⑥ and ⑦) by the retry processing.

Figure 24:
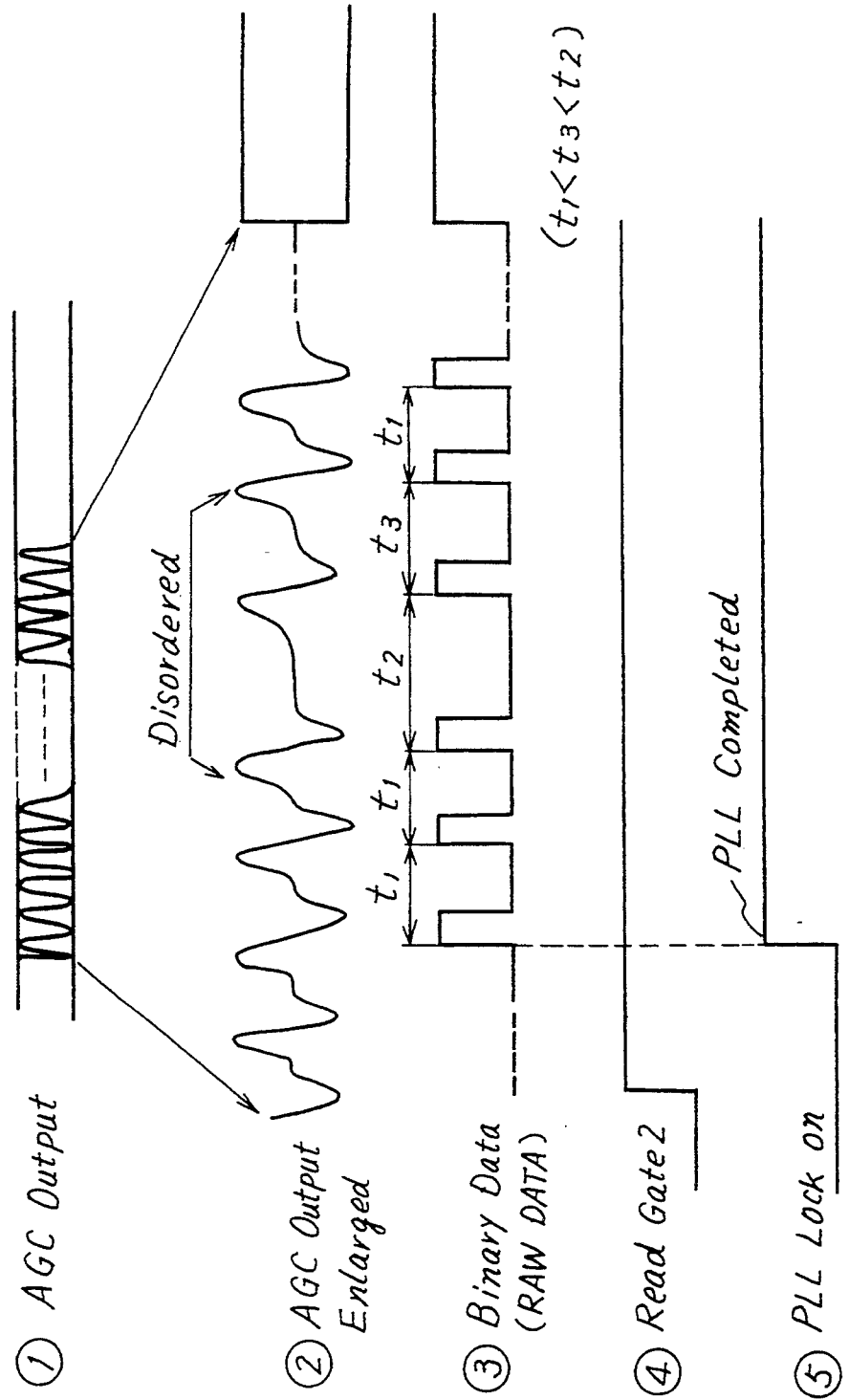
FIG. 24 is a timing chart (part 2) of a retry operation.

FIG. 24 is a timing chart showing processing in which the PLL is locked before a defect portion.

This example shows a processing example in which the waveform is disordered as shown at 1 and 2 in FIG. 24 due to a defect on an optical disk.

At this time, the period of the binary data, shown at 3 in FIG. 24, is disordered as at t1, t2 and t3 (t1<t-3<t2).

However, when the read-gate signal (Read Gate 2) is received in advance of the normal read-gate signal(see ④) and the PLL is locked before a defect portion (a portion where the waveform is disordered) of an optical disk (see ⑤), runaway is unlikely to occur at the defect portion that comes thereafter, so that reading can be effected normally (once the PLL is locked, it is unlikely to come out of the locked state even if the waveform is disordered).

It should be noted that in the foregoing embodiment the timing control circuit 121 may be arranged together with the upper-level controller 6 as one unit.

Figure 25:
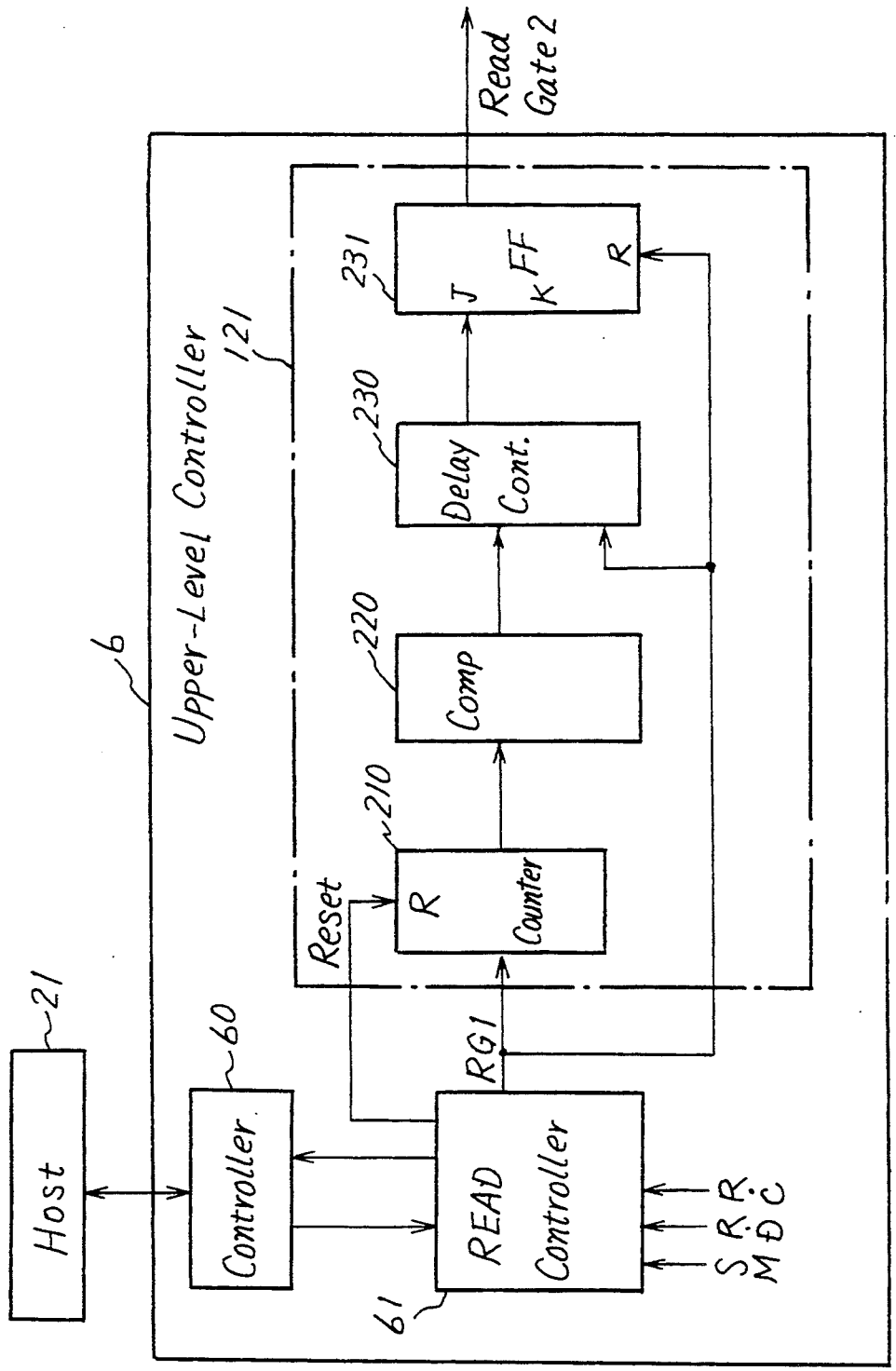
FIG. 25 is a block diagram of an upper-level controller in a modification of the second embodiment of the present invention.

FIG. 25 shows one example of the arrangement of the upper-level controller 6 in such a modification of the second embodiment. In this case, the timing control circuit 121, which is provided in the upper-level controller 6,comprises, a counter 210, a numerical comparator 220, a delay controller 230, and a read-gate generator 231 that is formed from JK-FF.

The operations of the upper-level controller 6 and the timing control circuit 121 in the modification shown in FIG. 25 will be explained below.

The controller 60 in the upper-level controller 6 receives a read instruction from the host 21 and sends information for reading to the read controller 61.

On receipt of an SM pulse (sector mark detecting pulse) from the optical head 2, the read controller 61 executes processing of reading an ID (Preformat Area) and raising the read-gate signal (Read Gate 1) at the VFO region in the user data.

First, the read-gate signal (Read Gate 1) is input to the counter 210.

When data has been read successfully, the read controller 61 transfers the data to the controller 60 and resets the counter 210.

The output of the counter 210 is input to the numerical comparator 220. The numerical comparator 220 and the delay controller 230 are arranged in the same way as the counter and numerical comparator in the arrangement shown in FIG. 18.

Accordingly, the operations of the numerical comparator 220 and the delay controller 230 are the same as the contents explained in connection with FIG. 19.

The output signal from the delay controller 230 is input to the read-gate generator 231.

The read-gate generator 231 sets the read-gate signal in response to the rise of the output of the delay controller 230 and resets it in response to the fall of the output.

The foregoing second embodiment may also be carried out as follows:

(1) The upper-level controller 6 may be provided separately from the optical disk apparatus.

(2) The arrangement of the second embodiment may also be applied to read-only optical disk apparatus (without a write circuit and other components for writing).

(3) Although in the processing shown in FIG. 21 three different kinds of delay time, i.e., ta, tb and tc are set as one example, four or more different kinds of delay time may be set.

(4) The timing control circuit 121 or the upper-level controller 6, shown in FIGS. 18 and 25, may be realized by a control program to have the same function as explained above, instead of hardware circuits.

Although the present invention has been described by way of the embodiments, it should be noted here that the present invention is not necessarily limited to the described embodiments. The scope of protection of the present invention covers various other embodiments for carrying out the present invention without departing from the idea of the present invention, as a matter of course.

What we claim is:

1. A disk apparatus for reading out data signals recorded on a disk, comprising:
   a head for picking up a data signal from the disk,
   a read circuit for receiving and digitizing the data signal picked up by the head into binary,
   a reference clock generator for generating a reference clock signal,
   a variable frequency oscillator for receiving a first read-gate signal, the digitized binary data signal and the reference clock signal and generating a readout data signal and a readout clock signal, each synchronized with the reference clock signal, and a detecting circuit for supplying the first read-gate signal to said variable frequency oscillator and receiving the reference clock signal from said reference clock generator and the readout clock signals from said readout circuit and for detecting an abnormal state of a synchronizing operation of said variable frequency oscillator and resetting the read-gate signal when a frequency difference between the reference clock signal and the readout clock signal exceeds a predetermined value.

2. A disk apparatus as claimed in claim 1,
wherein said detecting circuit comprises a first read-gate control circuit for controlling the timing of supplying the first read-gate signal to the variable frequency oscillator, a readout clock stabilizing circuit for providing an output signal after a time period corresponding a predetermined number of pulses of the readout clock signal, a comparator circuit for comparing the frequency of the readout clock signal with that of the reference clock signal and generating a pulse width which corresponds the difference between the frequencies of the readout clock signal and the reference clock signal, an abnormal detecting circuit for providing an output signal if the pulse width exceeds a predetermined value, and a pulse generating circuit for receiving an output signal from the abnormal detecting circuit and providing a control signal to the read-gate control circuit to reset the supplying of the first read-gate signal.

3. A disk apparatus as claimed in claim 2,
further comprising an upper-level controller for providing a second read-gate signal and wherein the read-gate control circuit receives the second read-gate signal from said upper-level controller and a digitized data signal from the read circuit and delays the timing of supplying to the variable frequency oscillator the first read-gate signal by a predetermined period of the digitized data signal.

4. A disk apparatus as claimed in claim 2,
wherein said readout clock stabilizing circuit receives a first read-gate signal from the read-gate control circuit and a readout clock signal from the variable frequency oscillator and provides an output signal after a predetermined number of pulses of the readout clock signal when the first read-gate signal is received.

5. A disk apparatus as claimed in claim 2,
wherein said comparator circuit receives as output signal of the read-clock stabilizing circuit, a readout clock signal from the variable frequency oscillator and a reference clock signal from the reference clock generator, and comprises first and second counters for counting pulses of the readout clock signal and the reference clock signal within each predetermined period after an output signal of the readout clock stabilizing circuit is received and an exclusive-or circuit for providing an output of the pulse-width corresponding to the difference between counted values of the first and second counters.

6. A disk apparatus as claimed in claim 2,
wherein said abnormal detecting circuit receives a reference clock signal and a pulse width from the comparator circuit and comprises a counter for counting pulses of the reference clock signal during the pulse width and providing an output signal if a counted value of the counter exceeds a predetermined value.

7. A disk apparatus as claimed in claim 2,
wherein said pulse generating circuit receives an output signal from said abnormal detecting circuit and provides a control signal to the read-gate control circuit thereby that the read-gate control circuit clears the supplying of a first read-gate signal to the variable frequency oscillator.

8. A disk apparatus for reading out data signals recorded on a disk, comprising:
a head for picking up a data signal from the disk,
a read circuit for receiving and digitizing the data signal picked out by the head into binary,
a reference clock generator for generating a reference clock signal and a variable frequency oscillator for receiving a first read-gate signal, the digitized binary data signal and the reference clock signal, and generating a readout data signal and a first readout clock signal, each synchronized with the reference clock signal,
an upper-level controller for providing a second read-gate signal, and
a detecting circuit for supplying the first read-gate signal to and receiving the reference clock signal from the reference clock generator and the readout clock signal from said variable frequency oscillator and for detecting an abnormal state of a synchronizing operation in said variable frequency oscillator and resetting the first read-gate signal when a frequency difference between the reference clock signal and the readout clock signal exceeds a predetermined value, said detecting circuit including,
a read-gate control circuit for receiving the second read-gate signal from the upper-level controller and the digitized data signal from the read circuit and for delaying the timing of supplying to the variable frequency oscillator the first read-gate signal by a predetermined period of the digitized data signal,
a readout clock stabilizing circuit for receiving the first read-gate signal from the read-gate control circuit and the readout clock signal from the variable frequency oscillator and providing an output signal after a predetermined number of pulses of the readout clock signals when the first read-gate signal is received,
a comparator circuit for receiving an output signal of the readout clock stabilizing circuit, a reference clock signal from the reference clock generator and a readout clock signal from the variable frequency oscillator, having first and second counters for respectively counting pulses of the readout clock signal and reference clock signal within a predetermined period after the output signal of the read out clock stabilizing circuit is received and an exclusive-or circuit for providing an output of a pulse-width corresponding to a difference between counted values of the first and second counters,
an abnormal detecting circuit for receiving a reference clock signal and a pulse width from the comparator circuit, having a counter for counting pulses of a reference clock signal during the pulse width and providing an output signal if a counted value of the counter exceeds a predetermined value, and
a pulse generating circuit for receiving an output signal from said abnormal detecting circuit and providing a control signal to the read-gate control circuit so that the read-gate control circuit clears the supplying of the first read-gate signal to the variable frequency oscillator.

9. A disk apparatus as claimed in claim 8, wherein said readout clock stabilizing circuit comprises a set of a D-FF(flip-flop), a counter and a JK-FF connected in series, said D-FF receiving and latching a read-gate signal sent from the read-gate control circuit by a readout clock signal supplied from the readout circuit, said counter having terminals to which a set signal is supplied, receiving a readout clock signal and a latched read-gate signal of the D-FF to be enabled and counting the readout clock signal up to a value determined by a set signal so as to provide a count-up signal and said JK-FF receiving and latching the count-up signal by the read-clock signal.

10. A disk apparatus as claimed in claim 9, wherein said comparator circuit comprises first and second sets of a D-FF(flip-flop), a counter and a JK-FF connected in series, said D-FF(flip-flop)s of the first and second sets receiving and latching the output of the JK-FF of a readout clock stabilizing circuit by a readout clock signal and a reference clock signal respectively, said counters of the first and second sets having terminals to which a set signal is supplied, receiving a readout clock signal and a reference-clock signal respectively and a latched output of the JK-FF of the readout clock stabilizing circuit to be enabled and counting a readout clock signal and a reference clock signal respectively up to a value determined by the set signal so as to provide a count-up signal and said JK-FFs of the first and second sets receiving and latching the count-up signal by the readout clock signal and reference clock signal respectively and an exclusive-or circuit receiving a latched count-up signal respectively from said JK-FFs of the first and second sets and providing an exclusive-or output of the latched count-up signal.

11. A disk apparatus as claimed in claim 10, wherein said abnormal detecting circuit comprises a set of a D-FF(flip-flop), a counter and a JK-FF connected in series, said D-FF(flip-flop) receiving and latching an exclusive-or output of the comparator circuit by a reference-clock signal supplied from the readout circuit, said counter having a terminal to which a set signal is supplied, receiving a reference-clock signal and the latched exclusive-or output of the d-FF to be enabled and counting the reference-clock signal up to a value determined by the set signal so as to provide a count-up signal and said JK-FF receiving and latching the count-up signal by the reference-clock signal.

12. A disk apparatus reading out a data recorded on a disk, comprising:
a head for picking up a data signal from the disk,
a read circuit for receiving and digitizing the data signal picked out by the head into binary,
a reference clock generator for generating a reference clock signal,
a variable frequency oscillator for receiving a first read-gate signal, the digitized binary data signal and the reference clock signal and generating a readout data signal and a readout clock signal, each synchronized with the reference clock signal,
an upper-level controller for providing a second read-gate signal, and
a timing control circuit for receiving the second read-gate signal from the upper-level controller and controlling the timing of supplying the first read-gate signal to the variable frequency oscillator.

13. A disk apparatus as claimed in claim 12, wherein said timing control circuit comprises a counter for counting a number of supplying a first read-gate signal to the variable frequency oscillator and controlling the timing of supplying the first read-gate signal based on the counted number.

14. A disk apparatus as claimed in claim 13, wherein said timing control circuit further comprises a delay circuit for receiving a second read-gate signal provided from the upper-level controller and outputting a first read-gate signal with the delay time and a controller for controlling a delay time based on a counted number by said counter.

15. A disk apparatus as claimed in claim 14, wherein said controller controls a delay time within a possible phase lock range of the variable frequency oscillator.

* * * * *

UNITED STATES PATENT AND TRADEMARK OFFICE
CERTIFICATE OF CORRECTION

PATENT NO. : 5,386,405
DATED : January 31, 1995
INVENTOR(S) : Fujiwara et al.

It is certified that error appears in the above-indentified patent and that said Letters Patent is hereby corrected as shown below:

Column 1, line 64, delete "being" and insert --using--.

Column 2, lines 6-7, delete "-READ" and insert --READ--.

Column 6, line 42, delete "(FS)" and insert --(F5)--.

Column 6, line 68, after "to" insert --C4)--.

Column 7, line 5, delete "B" and insert --S-- after the word "terminals"

Column 13, line 25, before "retry out" insert --"--.

Column 14, line 66, delete "and-the" and insert --and the--.

Signed and Sealed this

Seventh Day of November, 1995

Attest:

BRUCE LEHMAN

*Attesting Officer*      *Commissioner of Patents and Trademarks*